(12) United States Patent
Tischler et al.

(10) Patent No.: US 10,791,600 B2
(45) Date of Patent: Sep. 29, 2020

(54) ILLUMINATION DEVICE CONTROL SYSTEMS AND METHODS

(71) Applicants: Michael A. Tischler, Vancouver (CA); William P. Coetzee, Coquitlam (CA); Paul Jungwirth, Burnaby (CA)

(72) Inventors: Michael A. Tischler, Vancouver (CA); William P. Coetzee, Coquitlam (CA); Paul Jungwirth, Burnaby (CA)

(73) Assignee: COOLEDGE LIGHTING INC., Richmond, British Columbia (CA)

( * ) Notice: Subject to any disclaimer, the term of this patent is extended or adjusted under 35 U.S.C. 154(b) by 0 days.

(21) Appl. No.: 15/215,992

(22) Filed: Jul. 21, 2016

(65) Prior Publication Data

US 2017/0019967 A1  Jan. 19, 2017

Related U.S. Application Data

(63) Continuation of application No. 14/976,828, filed on Dec. 21, 2015, now Pat. No. 9,520,784, which is a
(Continued)

(51) Int. Cl.
*H05B 45/37* (2020.01)
*H05B 45/10* (2020.01)
(Continued)

(52) U.S. Cl.
CPC ............ *H05B 45/37* (2020.01); *H02M 1/08* (2013.01); *H02M 3/158* (2013.01); *H05B 45/10* (2020.01);
(Continued)

(58) Field of Classification Search
CPC ............ H05B 33/0815; H05B 33/0845; H05B 33/0851; H05B 33/083; H05B 33/0827; H05B 45/37; H05B 45/10; H05B 45/46; H05B 45/48; H02M 1/08; H02M 3/158; H02M 2001/0009; H02M 3/33515;
(Continued)

(56) References Cited

U.S. PATENT DOCUMENTS 6,400,102 B1 * 6/2002 Ghanem ............ G01R 31/2653
307/60
7,932,681 B2    4/2011 Konno
(Continued)

FOREIGN PATENT DOCUMENTS

EP         2384093 A2    11/2011
WO    2010/027392 A1     3/2010
WO    2014/172181 A1    10/2014

OTHER PUBLICATIONS

PCT International Patent Application No. PCT/US2015/021751, International Search Report and Written Opinion dated Jun. 19, 2015, 10 pages.
(Continued)

*Primary Examiner* — Alexander H Taningco
*Assistant Examiner* — Amy X Yang
(74) *Attorney, Agent, or Firm* — Morgan, Lewis & Bockius LLP

(57) ABSTRACT

In various embodiments, a control system for an electronic circuit iteratively applies voltage to and senses current from a load to regulate operation of the load.

29 Claims, 18 Drawing Sheets

Related U.S. Application Data continuation of application No. 14/740,909, filed on Jun. 16, 2015, now Pat. No. 9,252,662, which is a continuation-in-part of application No. 14/538,392, filed on Nov. 11, 2014, now Pat. No. 9,270,169, which is a continuation of application No. 14/271,938, filed on May 7, 2014, now Pat. No. 8,937,439, which is a continuation of application No. 13/965,392, filed on Aug. 13, 2013, now Pat. No. 8,760,075.

(60) Provisional application No. 61/813,027, filed on Apr. 17, 2013.

(51) Int. Cl.
| | |
|---|---|
| *H05B 45/46* | (2020.01) |
| *H05B 45/48* | (2020.01) |
| *H02M 1/08* | (2006.01) |
| *H02M 3/158* | (2006.01) |
| *H02M 1/42* | (2007.01) |
| *H02M 3/335* | (2006.01) |
| *H02M 3/337* | (2006.01) |
| *H02M 1/00* | (2006.01) |
| *H05B 45/395* | (2020.01) |

(52) U.S. Cl.
CPC .............. *H05B 45/46* (2020.01); *H05B 45/48* (2020.01); *H02M 1/4225* (2013.01); *H02M 3/337* (2013.01); *H02M 3/33515* (2013.01); *H02M 2001/007* (2013.01); *H02M 2001/0009* (2013.01); *H05B 45/395* (2020.01); *Y02B 70/10* (2013.01)

(58) Field of Classification Search
CPC ......... H02M 1/4225; H02M 2001/007; H02M 3/337; Y02B 70/126
USPC ..... 315/274–280, 291, 247, 185 S, 307–326, 315/224–225, 246
See application file for complete search history.

(56) References Cited

U.S. PATENT DOCUMENTS

| | | | |
|---|---|---|---|
| 8,067,902 | B2 | 11/2011 | Newman, Jr. |
| 8,339,048 | B2 | 12/2012 | Newman, Jr. et al. |
| 8,749,140 | B2 | 6/2014 | Yan |
| 8,760,075 | B1 | 6/2014 | Tischler et al. |
| 8,937,439 | B2 | 1/2015 | Tischler et al. |
| 2002/0030455 | A1 | 3/2002 | Ghanem |
| 2009/0190065 | A1 | 7/2009 | Konno et al. |
| 2010/0060200 | A1 | 3/2010 | Newman, Jr. et al. |
| 2010/0134040 | A1 | 6/2010 | Elder |
| 2011/0309758 | A1* | 12/2011 | Yu .................. H05B 33/0827 315/192 |
| 2012/0212730 | A1 | 8/2012 | White |
| 2012/0268020 | A1 | 10/2012 | Newman, Jr. et al. |
| 2012/0268039 | A1 | 10/2012 | Chen |
| 2012/0327052 | A1 | 12/2012 | Bulevic et al. |
| 2013/0114255 | A1 | 5/2013 | Schick et al. |
| 2013/0187178 | A1 | 7/2013 | Tischler |
| 2014/0062318 | A1 | 3/2014 | Tischler et al. |
| 2014/0312788 | A1 | 10/2014 | Tischler et al. |
| 2015/0115907 | A1 | 4/2015 | Tischler et al. |
| 2015/0208469 | A1 | 7/2015 | Coetzee |

OTHER PUBLICATIONS

PCT International Patent Application No. PCT/US2014/033658, International Search Report and Written Opinion dated Sep. 12, 2014, 11 pages.

\* cited by examiner

ILLUMINATION DEVICE CONTROL SYSTEMS AND METHODS

RELATED APPLICATIONS

This application is a continuation of U.S. patent application Ser. No. 14/976,828, filed Dec. 21, 2015, which is a continuation of U.S. patent application Ser. No. 14/740,909, filed Jun. 16, 2015, which is a continuation-in-part of U.S. patent application Ser. No. 14/538,392, filed Nov. 11, 2014, which is a continuation of U.S. patent application Ser. No. 14/271,938, filed May 7, 2014, which is a continuation of U.S. patent application Ser. No. 13/965,392, filed Aug. 13, 2013, which claims the benefit of and priority to U.S. Provisional Patent Application No. 61/813,027, filed Apr. 17, 2013, the entire disclosure of each of which is incorporated herein by reference.

TECHNICAL FIELD

In various embodiments, the present invention relates generally to light-emitting systems and methods, and more specifically to such systems and methods that provide control over various lighting parameters in systems featuring strings of light-emitting elements.

BACKGROUND

Solid-state lighting is an attractive alternative to incandescent and fluorescent lighting systems because of its relatively higher efficiency, robustness and long life. However, many solid-state lighting systems utilize light-emitting diodes (LEDs) that require different drive circuitry than incandescent and fluorescent light emitters. LEDs are typically operated in current-control mode, in which the current through the LED is controllably set to particular values to achieve desired optical characteristics, such as brightness levels.

Manufacturing variations in electronic components may result in a distribution of electrical and optical parameters. For example, in the case of LEDs, there is generally a distribution in parameters such as forward voltage, light output power and wavelength. For LED-based lighting systems, particularly where such systems include arrays of LEDs, such variations result in the need for a system that can accommodate possible variations not only in the manufacturing distribution, but also that may arise from other sources, such as ambient or operational temperature variations, aging, or the like. This applies not only to light-emitting elements (LEEs), such as LEDs, but to all other active and passive components that may be in the system, e.g., to control the current to the LEDs or to power the entire system.

For example, consider the system shown in FIG. 1, which features one or more strings 160 of series-connected LEEs 110 and a current-control element (CCE) 120. The combination of the LEEs and the CCEs may be called a light-emitting array. A light-emitting array may include or consist essentially of one or more than one light-emitting string 160. The string voltage is the voltage of the sum of the forward voltages of the individual LEEs at the desired operating current added to the voltage dropped across CCE 120. In one example, for GaN-based blue LEDs, the forward voltage, for a fixed current, may be in the range of about 2.6 V to about 3.1 V, depending on variations in the LED fabrication process. Thus, depending on the distribution of forward voltage characteristics, the voltage across the 10 LEDs in FIG. 1 may range from about 26 V to about 31 V. For a light-emitting array with multiple strings in parallel, as shown in FIG. 1, a string with a relatively low string voltage will generally result in a relatively higher voltage dropped over CCE 120, whereas a string with a relatively higher string voltage will generally have a relatively lower voltage dropped over CCE 120. In the design of such systems the voltage of power supply 130 must be large enough to accommodate the highest possible string voltage within the manufacturing and operational distribution of the light-emitting array as well as the voltage supply.

Consider a relatively common case where the forward voltage of each LEE is nominally about 2.9 V and the nominal voltage drop across CCE 120 is about 2 V. For a string of 10 LEEs, the string voltage is then about 31 V. This sets the nominal value of voltage to be supplied to the light-emitting array at about 31 V.

Now consider the scenario where the string voltage is on the high end of the range, for example where the LEE forward voltage is about 3.1 V and the voltage drop across the 10 LEEs is about 31 V. In some embodiments, CCE 120 may require at least about 2 V to operate, so the light-emitting array requires a supplied voltage of 33 V, 2 V higher than the nominal amount. Next, consider the scenario where the string voltage is on the low end of the range, for example where the LEE forward voltage is about 2.7 V. The voltage drop across the 10 LEEs is then about 27 V.

In this situation, the voltage supply needs to be about 33 V to accommodate the high end of the LEE forward voltage distribution. However, in the nominal case, the voltage dropped across CCE 120 is 4 V and in the minimum forward voltage case it is 6 V. Thus, the power dissipated in CCE 120 in the nominal case is twice that of the maximum forward voltage case, and the power dissipated in CCE 120 in the minimum forward voltage case is three times that of the maximum forward voltage case. Even without accounting for other variations, such as in the voltage supply, CCE 120, or operational variations, it is clear that such a design may be optimized for efficiency in a narrow set of parameter ranges, but as a result of manufacturing and operational variations, may operate at significantly lower efficiencies. Further, the additional power dissipated in CE 120 results in additional heat, which may be difficult to remove and may also lead to thermal degradation and a reduction in lifetime and/or reliability.

One approach to mitigating this problem is reduce the manufacturing and/or operational variations that might be encountered, for example by sorting and binning LEEs, using higher precision components in the voltage supply and CCE, controlling the ambient temperature range, or the like. However, these approaches are undesirable because they are time consuming and expensive.

Accordingly there is a need for solutions that provide improved drive capability for LEE systems, in particular providing improved control of current through the LEEs as well as high efficiency.

SUMMARY

In accordance with certain embodiments, the signature of the relationship between load current and applied voltage is dynamically evaluated and used to set a desired voltage level that matches the load to achieve a desired operational result, e.g., optimizing a given system for efficiency. Different voltages are applied to the load and the difference in resulting currents is utilized to adjust the subsequent applied voltage. This iterative procedure is generally performed during the entire operation of the load, rather than merely during a "start-up" period soon after power is initially applied. In this manner, variations in the electrical characteristics of the load due to aging and/or environmental (e.g., temperature) changes are addressed via changes in the applied voltage, thereby regulating operation of the load and optimizing its efficiency. Furthermore, the control system may be utilized with any of a variety of different loads having different electrical characteristics (e.g., current-voltage characteristics) while automatically optimizing efficiency thereof.

Additional details of lighting systems in accordance with embodiments of the present invention appear within U.S. patent application Ser. No. 13/970,027, filed Aug. 19, 2013 (the '027 application), U.S. patent application Ser. No. 13/799,807, filed Mar. 13, 2013 (the '807 application), and U.S. patent application Ser. No. 13/748,864, filed Jan. 24, 2013 (the '864 application), the entire disclosure of each of which is incorporated by reference herein.

As utilized herein, the term "light-emitting element" (LEE) refers to any device that emits electromagnetic radiation within a wavelength regime of interest, for example, visible, infrared or ultraviolet regime, when activated, by applying a potential difference across the device or passing a current through the device. Examples of LEEs include solid-state, organic, polymer, phosphor-coated or high-flux LEDs, microLEDs (described below), laser diodes or other similar devices as would be readily understood. The emitted radiation of a LEE may be visible, such as red, blue or green, or invisible, such as infrared or ultraviolet. A LEE may produce radiation of a spread of wavelengths. A LEE may feature a phosphorescent or fluorescent material for converting a portion of its emissions from one set of wavelengths to another. A LEE may include multiple LEEs, each emitting essentially the same or different wavelengths. In some embodiments, a LEE is an LED that may feature a reflector over all or a portion of its surface upon which electrical contacts are positioned. The reflector may also be formed over all or a portion of the contacts themselves. In some embodiments, the contacts are themselves reflective.

An LEE may be of any size. In some embodiments, an LEE has one lateral dimension less than 500 µm, while in other embodiments an LEE has one lateral dimension greater than 500 µm. Exemplary sizes of a relatively small LEE may include about 175 µm by about 250 µm, about 250 µm by about 400 µm, about 250 µm by about 300 µm, or about 225 µm by about 175 µm. Exemplary sizes of a relatively large LEE may include about 1000 µm by about 1000 µm, about 500 µm by about 500 µm, about 250 µm by about 600 µm, or about 1500 µm by about 1500 µm. In some embodiments, an LEE includes or consists essentially of a small LED die, also referred to as a "microLED." A microLED generally has one lateral dimension less than about 300 µm. In some embodiments, the LEE has one lateral dimension less than about 200 µm or even less than about 100 µm. For example, a microLED may have a size of about 225 µm by about 175 µm or about 150 µm by about 100 µm or about 150 µm by about 50 µm. In some embodiments, the surface area of the top surface of a microLED is less than 50,000 µm$^2$ or less than 10,000 µm$^2$. The size of the LEE is not a limitation of the present invention, and in other embodiments the LEE may be relatively larger, e.g., the LEE may have one lateral dimension on the order of at least about 1000 µm or at least about 3000 µm. In some embodiments the LEE may emit white light or substantially white light.

In some embodiments, various elements such as substrates or lightsheets are "flexible" in the sense of being pliant in response to a force and resilient, i.e., tending to elastically resume an original configuration upon removal of the force. Such elements may have a radius of curvature of about 1 m or less, or about 0.5 m or less, or even about 0.1 m or less. In some embodiments, flexible elements have a Young's Modulus less than about 100 N/m$^2$, less than about 50 N/m$^2$, or even less than about 10 N/m$^2$. In some embodiments, flexible elements have a Shore A hardness value less than about 100; a Shore D hardness less than about 100; and/or a Rockwell hardness less than about 150.

In an aspect, embodiments of the invention feature a method for controlling a circuit via application of first and second voltages. The circuit incorporates a load having electrical characteristics, which may include or consist essentially of a non-linear current-voltage relationship. In a step (A), the first voltage is applied to the load. In a step (B), a first current resulting from the first voltage applied to the load is measured. In a step (C), the second voltage is applied to the load. In a step (D), a second current resulting from the second voltage applied to the load is measured. A current difference between the second current and the first current has a magnitude and a polarity. In a step (E), the first voltage is set equal to the second voltage. In a step (F), the second voltage is altered by a voltage increment (which may be positive or negative) based on the magnitude and the polarity of the current difference. In a step (G), steps (A)-(F) are repeated during operation of the circuit to regulate operation of the load notwithstanding any changes in the electrical characteristics (e.g., the non-linear current-voltage relationship) of the load during operation.

In another aspect, embodiments of the invention feature a method for controlling a circuit via application of first and second voltages. The circuit incorporates a load having electrical characteristics, which may include or consist essentially of a non-linear current-voltage relationship. In a step (A), the first voltage is applied to the load. In a step (B), a first current resulting from the first voltage applied to the load is measured. In a step (C), the second voltage is applied to the load. In a step (D), a second current resulting from the second voltage applied to the load is measured. A current difference between the second current and the first current has a magnitude and a polarity. In a step (E), if the magnitude of the current difference is greater than a pre-determined value and the polarity of the current difference is positive, the first voltage is set equal to the second voltage and the second voltage is increased by a voltage increment. In a step (F), if the magnitude of the current difference is smaller than the pre-determined value and the polarity of the current difference is negative, the first voltage is set equal to the second voltage and the second voltage is decreased by the voltage increment. In a step (G), if the magnitude of the current difference is greater than the pre-determined value and the polarity of the current difference is negative, the first voltage is set equal to the second voltage and the second voltage is increased by the voltage increment. In a step (H), if the magnitude of the current difference is smaller than the pre-determined value and the polarity of the current difference is negative, the first voltage is set equal to the second voltage and the second voltage is decreased by the voltage increment. In a step (I), steps (A)-(H) are repeated during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The magnitude of the current difference may be greater than the pre-determined value, the second voltage may be increased above a maximum operating voltage, and the second voltage may be decreased to the maximum operating voltage or less prior to applying the second voltage to the load. The maximum operating voltage may be approximately 60 V. The method may include pausing for a pre-determined amount of time prior to applying the second voltage to the load. The pre-determined amount of time may be selected from the range of approximately 10 milliseconds to approximately 3600 seconds. The pre-determined amount of time may increase as a number of times steps (A)-(H) are repeated increases. The voltage increment may decrease as a number of times steps (A)-(H) are repeated increases.

After a plurality of repetitions of steps (A)-(H), the circuit may operate at a stable operating range for at least a second plurality of repetitions of steps (A)-(H). As used herein, a "stable operating range" is a substantially unchanging range of voltages bounded by the first and second voltages; that is, the voltage applied to the load oscillates between substantially constant first and second voltages, thereby defining the stable operating range. The stable operating range is generally constant while the current-voltage relationship of the load is substantially constant; changes in the current-voltage relationship of the load may alter the stable operating range.

The method may include pausing for a pre-determined amount of time prior to applying the second voltage to the load, and the pre-determined amount of time may increase at least once while the circuit operates at the stable operating range. The pre-determined amount of time may be reset to a default value if circuit operation diverges from the stable operating range. The voltage increment may be decreased at least once while the circuit operates at the stable operating range. After the voltage increment has been decreased, the voltage increment may be maintained at a substantially constant value notwithstanding continued circuit operation at the stable operating range. The voltage increment may be reset to a default value if the circuit operation diverges from the stable operating range.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light. The non-linear current-voltage relationship of the load may include a knee (i.e., a change in slope), a stationary point (i.e., a local or absolute maximum or minimum), and/or an inflection point.

In yet another aspect, embodiments of the invention feature a control system for operating a load via application of first and second voltages. The load may have electrical characteristics that may include or consist essentially of a non-linear current-voltage relationship. The control system includes or consists essentially of a variable voltage source, a sense element, and a controller. The controller is configured to, in a step (A), apply, via the variable voltage source, the first voltage to the load, in a step (B), measure, via the sense element, a first current resulting from the first voltage applied to the load, in a step (C), apply, via the variable voltage source, the second voltage to the load, and in a step (D), measure, via the sense element a second current resulting from the second voltage applied to the load. A current difference between the second current and the first current has a magnitude and a polarity. The controller is further configured to, in a step (E), if the magnitude of the current difference is greater than a pre-determined value and the polarity of the current difference is positive, (i) set the first voltage equal to the second voltage and (ii) increase the second voltage by a voltage increment. The controller is further configured to, in a step (F), if the magnitude of the current difference is smaller than the pre-determined value and the polarity of the current difference is negative, (i) set the first voltage equal to the second voltage and (ii) decrease the second voltage by the voltage increment. The controller is further configured to, in a step (G), if the magnitude of the current difference is greater than the pre-determined value and the polarity of the current difference is negative, (i) set the first voltage equal to the second voltage and (ii) increase the second voltage by the voltage increment. The controller is further configured to, in a step (H), if the magnitude of the current difference is smaller than the pre-determined value and the polarity of the current difference is negative, (i) set the first voltage equal to the second voltage and (ii) decrease the second voltage by the voltage increment. The controller is further configured to, in a step (I), repeat steps (A)-(H) during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The load may have a non-linear current-voltage relationship. The load may include or consist essentially of a plurality of light-emitting elements. The load may include or consist essentially of a plurality of light-emitting strings each including or consisting essentially of a plurality of series-connected light-emitting elements and at least one current-control element. The at least one current-control element may include or consist essentially of two transistors and two resistors. The sense element may include or consist essentially of a resistor.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light. The non-linear current-voltage relationship of the load may include a knee, a stationary point, and/or an inflection point.

In another aspect, embodiments of the invention feature a control system for operating a load via application of first and second voltages. The load may have electrical characteristics that may include or consist essentially of a non-linear current-voltage relationship. The control system includes or consists essentially of a variable voltage source, a sense element, and a controller. The controller is configured to, in a step (A), apply, via the variable voltage source, the first voltage to the load, in a step (B), measure, via the sense element, a first current resulting from the first voltage applied to the load, in a step (C), apply, via the variable voltage source, the second voltage to the load, and in a step (D), measure, via the sense element a second current resulting from the second voltage applied to the load. A current difference between the second current and the first current has a magnitude and a polarity. The controller is further configured to, in a step (E), set the first voltage equal to the second voltage, and in a step (F), alter (i.e., add to or subtract from) the second voltage by a voltage increment based on the magnitude and the polarity of the current difference. The controller is further configured to, in a step (G), repeat steps (A)-(F) during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The controller may be configured to alter the second voltage by one or more of the following. If the magnitude of the current difference is greater than a pre-determined value and the polarity of the current difference is positive, the second voltage is increased by the voltage increment. If the magnitude of the current difference is smaller than the pre-determined value and the polarity of the current difference is negative, the second voltage is decreased by the voltage increment. If the magnitude of the current difference is greater than the pre-determined value and the polarity of the current difference is negative, the second voltage is increased by the voltage increment. If the magnitude of the current difference is smaller than the pre-determined value and the polarity of the current difference is negative, the second voltage is decreased by the voltage increment.

The load may include or consist essentially of a plurality of light-emitting elements. The load may include or consist essentially of a plurality of light-emitting strings each including or consisting essentially of a plurality of series-connected light-emitting elements and at least one current-control element. The at least one current-control element may include or consist essentially of two transistors and two resistors. The sense element may include or consist essentially of a resistor. The non-linear current-voltage relationship of the load may include a knee, a stationary point, and/or an inflection point.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light.

In another aspect, embodiments of the invention feature a method for controlling, via application of first and second voltages, a circuit incorporating a load having a non-linear current-voltage relationship. In a step (A), the first voltage is modulated in response to a modulation signal, thereby generating a first voltage waveform having a first voltage level and a second voltage level. In a step (B), the first voltage waveform is applied to the load. In a step (C), a first current resulting from the first voltage waveform applied to the load is measured. The first current is measured when the first voltage waveform is at the first voltage level. The first current may only be measured when the first voltage waveform is at the first voltage level. In a step (D), the second voltage is modulated in response to the modulation signal, thereby generating a second voltage waveform having a third voltage level and a fourth voltage level. In a step (E), the second voltage waveform is applied to the load. In a step (F), a second current resulting from the second voltage waveform applied to the load is measured. The second current is measured when the second voltage waveform is at the third voltage level. The second current may only be measured when the second voltage waveform is at the third voltage level. A current difference between the second current and the first current has a magnitude and a polarity. In a step (G), the second voltage is altered by a voltage increment having a magnitude and polarity based at least in part on the magnitude and polarity of the current difference between the second current and the first current. In a step (H), steps (A)-(G) are repeated during operation of the circuit to regulate operation of the load notwithstanding any changes in the non-linear current-voltage relationship of the load during operation.

Embodiments of the invention may include one or more of the following in any of a variety of combinations. The first voltage waveform may include or consist essentially of a series of voltage waves as a function of time. One or more (e.g., all) of the voltage waves may include or consist essentially of (i) a rising portion in which the voltage increases from the second voltage level to the first voltage level, (ii) a center portion at the first voltage level, and (iii) a falling portion in which the voltage falls from the first voltage level to the second voltage level. One or more (e.g., all) of the voltage waves may include or consist essentially of a substantially square wave having a minimum at the second voltage level and a maximum at the first voltage level. The modulation signal may change between step (A) and step (D). The first voltage may be set equal to the second voltage after step (F). Step (g) may include or consist essentially of (i) if the magnitude of the current difference is greater than a pre-determined value and the polarity of the current difference is positive, increasing the second voltage by the voltage increment, (ii) if the magnitude of the current difference is smaller than the pre-determined value and the polarity of the current difference is positive, decreasing the second voltage by the voltage increment, (iii) if the magnitude of the current difference is greater than the pre-determined value and the polarity of the current difference is negative, increasing the second voltage by the voltage increment, and/or (iv) if the magnitude of the current difference is smaller than the pre-determined value and the polarity of the current difference is negative, decreasing the second voltage by the voltage increment.

The second voltage may be increased above a maximum operating voltage, and the second voltage may be decreased to the maximum operating voltage or less prior to applying the second voltage waveform to the load. There may be a pause for a pre-determined amount of time prior to applying the second voltage waveform to the load. The pre-determined amount of time may increase as a number of times steps (A)-(G) are repeated increases. The circuit may be configured to operate at a design point. The design point may include or consist essentially of a design current and/or a design voltage. The voltage increment may be less than about 10% of the design voltage. The magnitude and polarity of the voltage increment may be determined from (i) a comparison of a pre-determined value to the magnitude of the current difference between the second current and the first current and (ii) the polarity of the current difference between the second current and the first current. The pre-determined value may be constant as steps (A)-(G) repeat. The circuit may be configured to operate at a design point, the design point including or consisting essentially of a design current and a design voltage, and the pre-determined value may be less than approximately 20% of the design current. The pre-determined value may decrease as a number of times steps (A)-(G) are repeated increases.

The load may include or consist essentially of a light-emitting array. The light-emitting array may include or consist essentially of first and second spaced-apart power conductors and a plurality of light-emitting strings. At least one light-emitting string (i) may include or consist essentially of a plurality of interconnected light-emitting diodes spaced along the light-emitting string, (ii) may have a first end electrically coupled to the first power conductor, and (iii) may have a second end electrically coupled to the second power conductor. The power conductors may supply power to each of the light-emitting strings. The light-emitting diodes may emit substantially white light. The light-emitting array may include a plurality of control elements. At least one control element may be (i) electrically connected to at least one light-emitting string and (ii) configured to utilize power supplied from the power conductors to control the current to the at least one light-emitting string to which it is electrically connected.

The voltage increment may decrease as a number of times steps (A)-(G) are repeated increases. After a plurality of repetitions of steps (A)-(G), the circuit may operate at a stable operating range of voltages for at least a second plurality of repetitions of steps (A)-(G). There may be a pause for a pre-determined amount of time prior to applying the second voltage waveform to the load. The pre-determined amount of time may increase at least once while the circuit operates at the stable operating range. The pre-determined amount of time may be reset to a default value if circuit operation diverges from the stable operating range. The voltage increment may be decreased at least once while the circuit operates at the stable operating range. The magnitude and/or polarity of the voltage increment may be determined from a table of pre-determined rules. The non-linear current-voltage characteristic of the load may include a knee therewithin. The current may increase as the voltage increases in the knee region. The current may decrease as the voltage increases in the knee region. The non-linear current-voltage characteristic of the load may include a global minimum and/or a global maximum therewithin.

A first plurality of cycles of steps (A)-(G) repeating may constitute a start-up phase. A second plurality of cycles of steps (A)-(G) repeating may constitute an operation phase. The start-up phase may precede the operation phase. During the start-up phase, the voltage increment may decrease as a number of times steps (A)-(G) are repeated increases. During the operation phase, the voltage increment may decrease as a number of times steps (A)-(G) are repeated increases. After the start-up phase, the circuit may operate at a stable operating range of voltages for at least a portion of the operating phase. The load may include or consist essentially of a lighting system. An intensity of light emitted by the lighting system may be at least partially determined by a current at which the lighting system operates. The non-linear current-voltage characteristic of the load may include a local minimum and/or a local maximum therewithin. The modulation signal may include or consist essentially of a dimming signal.

In another aspect, embodiments of the invention feature a control system for operating a load via application of first and second voltages. The load has a non-linear current-voltage relationship. The control system includes or consists essentially of a variable voltage source, a sense element, a modulation controller, and a controller. The modulation controller is configured to (i) modulate the first voltage in response to a modulation signal, thereby generating a first voltage waveform having a first voltage level and a second voltage level, and (ii) modulate the second voltage in response to the modulation signal, thereby generating a second voltage waveform having a third voltage level and a fourth voltage level. The controller is configured to (A) apply, via the variable voltage source and/or the modulation controller, the first voltage waveform to the load, (B) measure, via the sense element, a first current resulting from the first voltage waveform applied to the load, the first current being measured when the first voltage waveform is at the first voltage level, (C) apply, via the variable voltage source and/or the modulation controller, the second voltage waveform to the load, (D) measure, via the sense element a second current resulting from the second voltage waveform applied to the load, the second current being measured when the second voltage waveform is at the third voltage level, a current difference between the second current and the first current having a magnitude and a polarity, (E) alter the second voltage by a voltage increment based on the magnitude and the polarity of the current difference, and (F) repeat steps (A)-(E) during operation of the circuit to regulate operation of the load notwithstanding any changes in the non-linear current-voltage relationship of the load during operation.

Embodiments of the invention may include one or more of the following in any of a variety of combinations. The controller may be configured to set the first voltage equal to the second voltage after step (D). The controller may be configured to alter the second voltage by (i) if the magnitude of the current difference is greater than a pre-determined value and the polarity of the current difference is positive, increasing the second voltage by the voltage increment, (ii) if the magnitude of the current difference is smaller than the pre-determined value and the polarity of the current difference is positive, decreasing the second voltage by the voltage increment, (iii) if the magnitude of the current difference is greater than the pre-determined value and the polarity of the current difference is negative, increasing the second voltage by the voltage increment, and/or (iv) if the magnitude of the current difference is smaller than the pre-determined value and the polarity of the current difference is negative, decreasing the second voltage by the voltage increment. The non-linear current-voltage relationship of the load may include a knee therewithin. The load may include or consist essentially of a plurality of light-emitting elements. The load may include or consist essentially of a plurality of light-emitting strings each including or consisting essentially of a plurality of series-connected light-emitting elements and at least one current-control element. The at least one current-control element may include or consist essentially of two transistors and two resistors. The sense element may include or consist essentially of one or more resistors. The control system may include one or more switches controlled by the modulation controller to modulate the first voltage and/or the second voltage.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "substantially," "approximately," and "about" mean±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
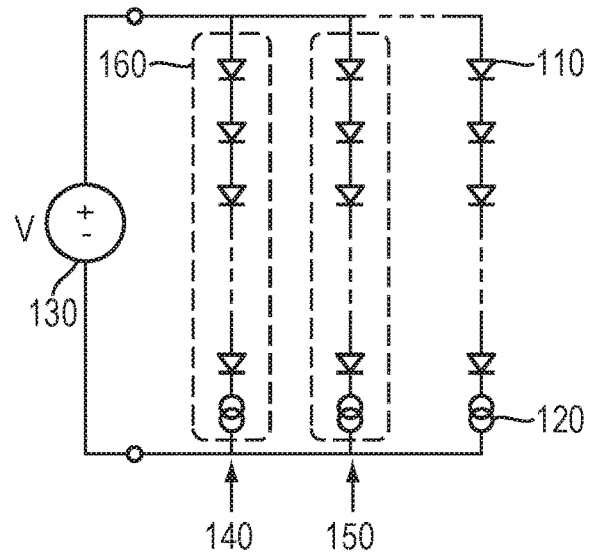
FIG. 1 is a circuit diagram of an illumination system.
Figure 2A:
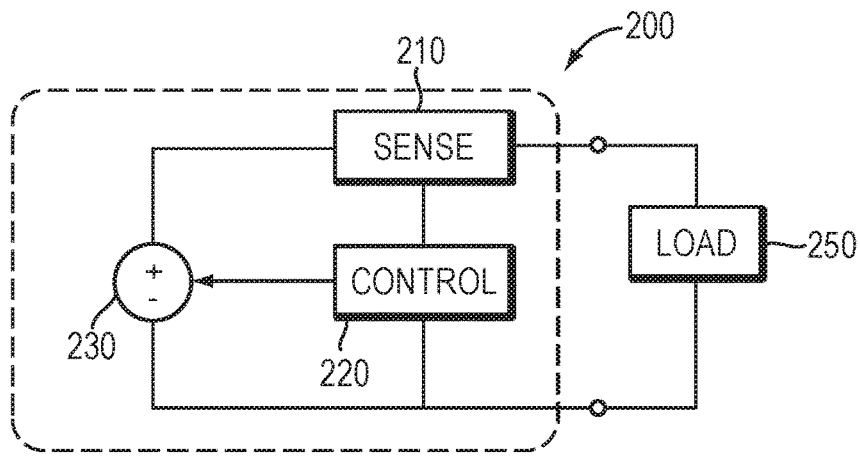
FIG. 2A is a block diagram of a system in accordance with various embodiments of the invention.

FIG. 2A depicts an exemplary adaptive power system 200 in accordance with embodiments of the present invention, although alternative systems with similar functionality are also within the scope of the invention. As depicted, adaptive power system 200 includes or consists essentially of a variable voltage source 230, a sense element 210 and a controller 220. Adaptive power system 200 is connected to a load 250 (e.g., one or more LEEs or light-emitting strings). The controller 220, which embodies principles of the present invention, directs variable voltage source 230 to supply a specific voltage in response to a process embedded within controller 220 and the value of the current sensed by sense element 210, as will be discussed herein.

Figure 2B:
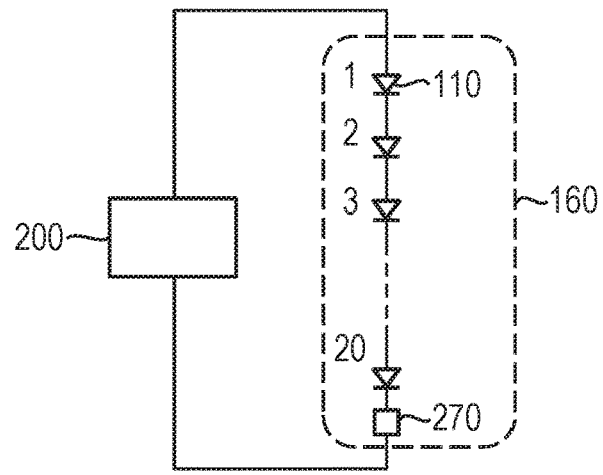
FIGS. 2B and 2C are partial circuit diagrams of illumination systems in accordance with various embodiments of the invention.

In one embodiment of the present invention, adaptive power system 200 powers one or more light-emitting strings electrically coupled in parallel, where each light-emitting string includes or consists essentially of one or more LEEs 110 electrically coupled in series with each other and with a CCE 270, as shown in FIG. 2B. Referring to the structure of FIG. 2B, a string 160 is equivalent to load 250 in FIG. 2A. The system shown in FIG. 2B includes or consists essentially of 20 LEEs 110 in string 160; however, this is not a limitation of the present invention, and in other embodiments the number of LEEs 110 per string 160 may be more or fewer than 20. Moreover, although the system shown in FIG. 2B includes one string 160, this also is not a limitation of the present invention, and in other embodiments more than one string 160 may be utilized, for example in a parallel electrical configuration.

Figure 2C:
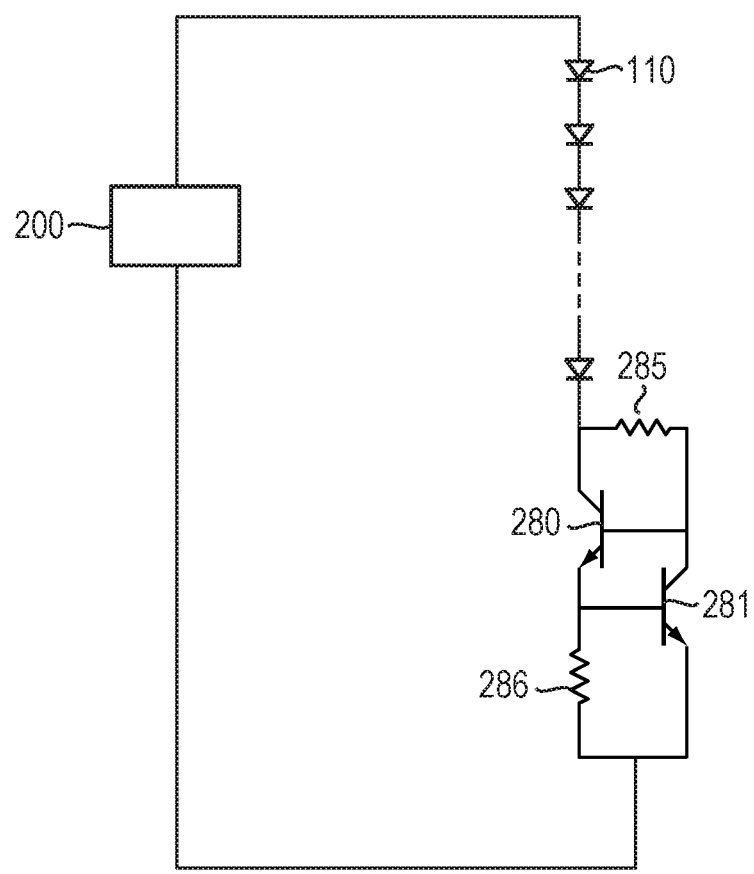

FIG. 2C shows a system similar to that of FIG. 2B, and illustrates one embodiment of CCE 270. In the depicted embodiment, CCE 270 includes or consists essentially of two resistors 285, 286 and two transistors 280, 281 interconnected as shown in FIG. 2B. In general, CCEs may include one or more passive components, such as resistors, capacitors, inductors, or fuses, as well as active components, e.g., transistors and diodes.

Figure 3A:
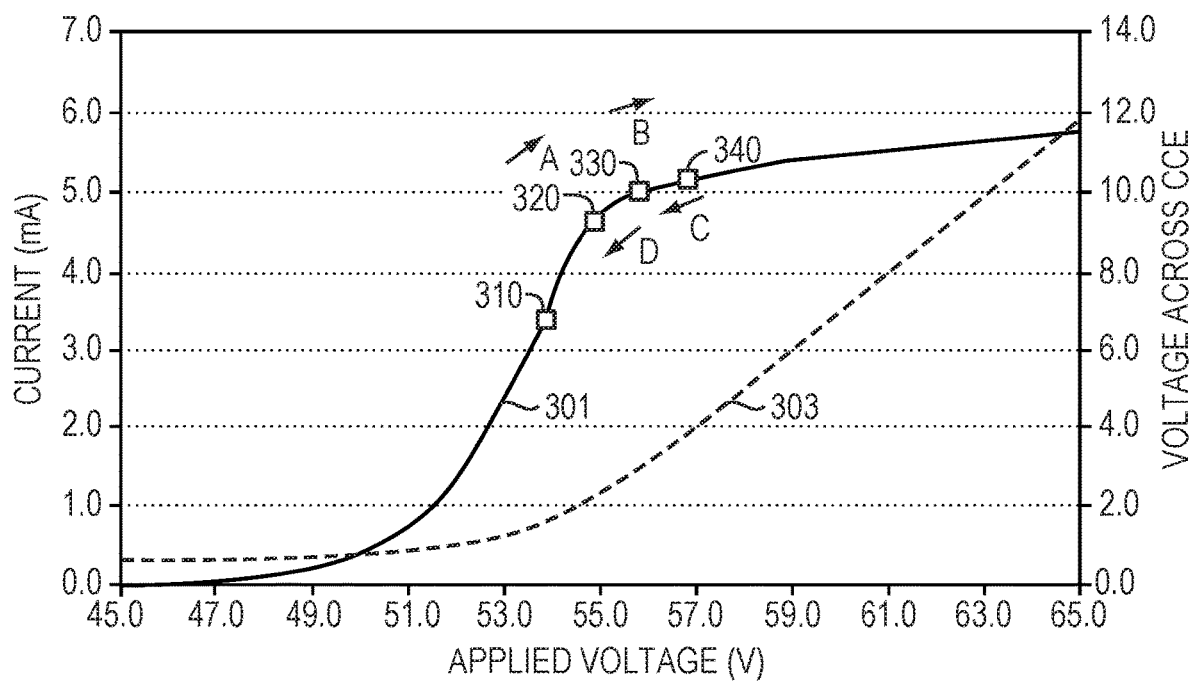
FIGS. 3A-3H are graphs of current-voltage relationships of loads in accordance with various embodiments of the invention.

FIG. 3A shows a simulation of a string current 301 and a voltage 303 across CCE 270 as a function of applied voltage for the system of FIG. 2C. In this example the system includes 20 GaN-based LEEs 110 having a forward voltage in the range of about 2.6 V to about 3.1 V at a current of about 5 mA. In this example the circuit is designed to control the string current to about 5 mA; resistor 285 has a value of about 39 kohms, resistor 286 has a value of about 113 ohms, and transistors 280 and 281 may each be a MMBT2484 NPN general purpose amplifier manufactured by Fairchild Semiconductor. If LEEs 110 have a nominal forward voltage of about 2.7 V, then the total voltage drop across all 20 LEEs 110 is about 54 V. In order for the circuit to operate, the applied voltage is at least about this value plus the voltage drop across CCE 270. (As utilized herein, the "design point" is a product-wide, rather than individual device-specific, designated operating current (or operating voltage designed to achieve the designated current); actual individual devices may vary from the design point in operation. As utilized herein, the "relatively optimal operating point" is the actual voltage required to achieve the desired operating current for a specific device at a specific time. During device operation the relatively optimal operating point may vary temporarily (e.g., due to temperature variations) or permanently (e.g., due to aging).)

As may be seen from FIG. 3A, the circuit starts to turn on at about 52 V, at which point the string current is about 2 mA. Increasing the applied voltage above this level produces a relatively rapid increase in current and then, at the design point of 5 mA, the value of applied voltage levels off at about 55.8 V. At this point the applied voltage is about 55.8 V, the voltage across CCE 270 is about 1.8 V, the voltage across the 20 LEEs 110 is about 54 V, and the current through the LEEs 110 is about 5 mA. As shown, operation of the circuit at applied voltages a small amount lower than or higher than the design point results in only small changes in the LEE 110 current. However, while the current is relatively well controlled, the efficiency may decrease at higher applied voltages because the voltage drop across CCE 270 accounts for a relatively larger portion of the overall voltage drop, which results in relatively more power dissipated as heat in this component. Thus, the efficiency decreases as the applied voltage is raised above the design point and, in preferred embodiments, the relatively optimal operating point is the minimum applied voltage that just achieves the desired current flow for a given device. One aspect of embodiments of the present invention is a system that automatically maintains the relatively optimal operating point. Specifically, the system may maintain the relatively optimal operating point via oscillating application of operating voltages that (1) are substantially constant over time (in the absence of temporary or permanent variations of the I-V characteristics of the devices of the load) and (2) bound the relatively optimal operating point within a stable operating range of voltages.

The operation of one embodiment of the invention may be understood in reference to FIG. 3A, which shows the load current 301 (current through LEEs 110) and the voltage drop 303 across CCE 270 as a function of applied voltage.

Figure 3B:
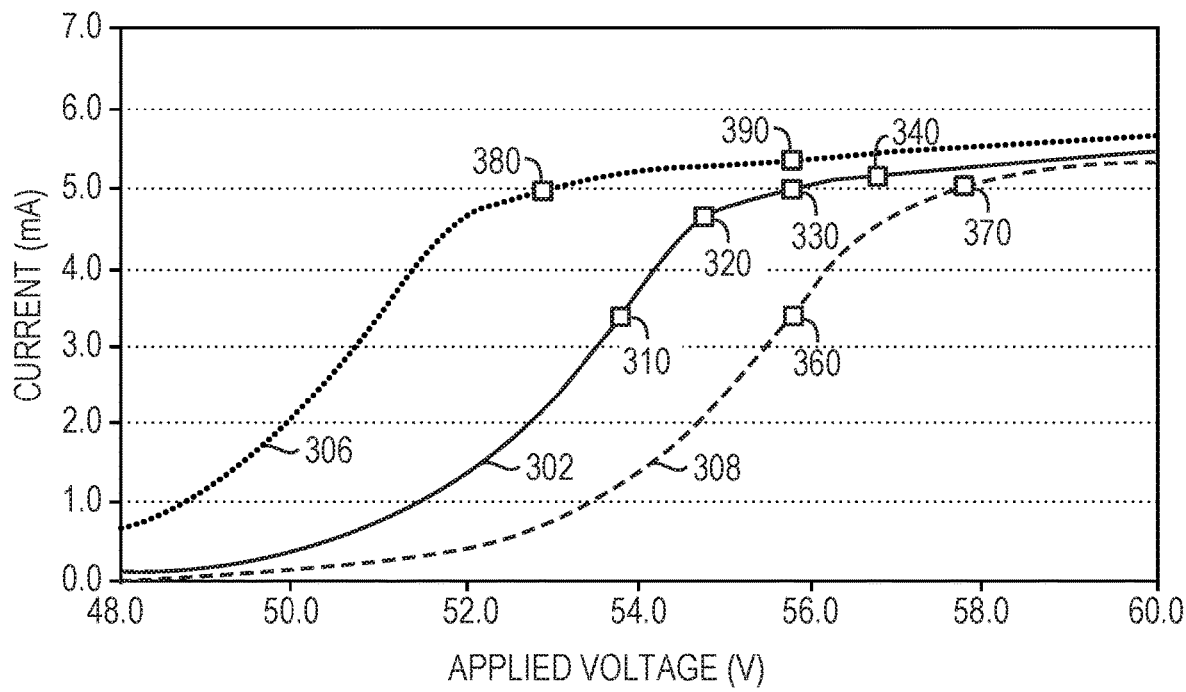

With reference to FIGS. 2B, 3A, and 3B, in one embodiment, operation of the system of FIG. 2B begins at the voltage at point 310, designated as $V_{310}$. The current at this point is measured and designated as $I_{310}$. The voltage is then incremented to the voltage indicated by point 320, giving a voltage $V_{320}$ and a current $I_{320}$. The magnitude and sign of the difference between $I_{320}$ and $I_{310}$ is then measured. If the magnitude of the difference is larger than a pre-determined value DI, and the sign of $I_{320}$–$I_{310}$ is positive, then the system increments the voltage once again to point 330, producing voltage $V_{330}$ and current $I_{330}$. The magnitude and sign of the difference between $I_{330}$ and $I_{320}$ is again measured. If the magnitude of the difference is larger than a pre-determined value, and the sign of $I_{330}$–$I_{320}$ is positive, then the system increments the voltage once again to point 340, producing voltage $V_{340}$ and current $I_{340}$. The magnitude and sign of the difference between $I_{340}$ and $I_{330}$ is again measured. In this case the difference between $I_{340}$ and $I_{330}$ is less than a pre-determined value, but the sign is still positive, so the system does not increment the voltage further. Instead, the system decrements the voltage, for example back to $V_{330}$ at the point 330. In a stable system, the decrement back to $V_{330}$ will typically result in a current of $I_{330}$. The magnitude and sign of the difference between $I_{340}$ and $I_{330}$ is measured. In this example the difference between $I_{340}$ and $I_{330}$ is less than the preset value, but the sign is negative, so the system decrements the voltage once more to point 320, where, typically in a stable system the voltage is $V_{320}$ and the current is $I_{320}$. Now the difference between $I_{320}$ and $I_{330}$ is determined and, again in a stable system, found to be larger than the pre-determined value. Also the sign is negative, so the system knows that it has gone too far and increments the applied voltage, for example back to $V_{330}$ where the current is $I_{330}$.

A table of rules for various embodiments of the present invention is shown in Table 1. Table 1 shows the direction of the voltage change (increment or decrement) as a function of the magnitude and sign of the difference between the two measured currents. As may be understood by this description, the voltage then steps back and forth around the design point 330, e.g., up to 340 and down to 320. FIG. 3A may be utilized to illustrate an exemplary embodiment of the present invention in which the system maintains the relatively optimal operating point via oscillating application of operating voltages that (1) are substantially constant over time (in the absence of temporary or permanent variations of the I-V characteristics of the devices of the load) and (2) bound the relatively optimal operating point within a stable operating range of voltages. The operation may be described from any starting point; here, starting with operating point 320, the system has just decremented itself from operating point 330. This operation is identified as Phase A in the phase cycle detailed below.

Phase A. At this point the operating point has just changed from point 330 to point 320 (i.e., the voltage has just decremented from $V_{330}$ to $V_{320}$). $I_{320}$–$I_{330}$ is evaluated and the determination is made that the sign (i.e., the polarity) is negative and the magnitude is greater than the predetermined value. As Table 1 indicates, rule 4 is then applied to increment the voltage to operating point 330.

Phase B. At this point the operating point has just changed from point 320 to point 330. $I_{330}$–$I_{320}$ is evaluated and the determination is made that the sign is positive and the magnitude is greater than the predetermined value. As Table 1 indicates, rule 1 is then applied to increment the voltage to operating point 340.

Phase C. At this point the operating point has just changed from point 330 to point 340. $I_{340}$–$I_{330}$ is evaluated and the determination is made that the sign is positive and the magnitude is less than the predetermined value. As Table 1 indicates, rule 2 is then applied to decrement the voltage to operating point 330.

Phase D. At this point the operating point has just changed from point 340 to point 330. $I_{330}$–$I_{340}$ is evaluated and the determination is made that the sign is negative and the magnitude is less than the predetermined value. As Table 1 indicates, rule 3 is then applied to decrement the voltage to operating point 320.

Phase D then leads back to Phase A, and the cycle continues in the absence of a change in the I-V relationship of the load. This will typically continue until there is a change in the system that modifies the current-voltage relationship, for example a shift in the curve, as described herein. Evaluation of the change in current for various changes in voltages results in the determination of and setting of relatively optimal operating point. This process may proceed not only during start-up of the system, but also during operation, such that any changes induced by environmental factors, aging, or the like are automatically accommodated. If the I-V relationship changes at any point in the cycle, the magnitude and sign of the current difference will result in application of an appropriate rule to bring the system back to the relatively optimal operation point defined by the new I-V relationship.

TABLE 1

$I_2-I_1$

| Rule | Magnitude compared to pre-determined value | Sign of difference | Voltage Change |
|---|---|---|---|
| 1 | Greater | + | Increment |
| 2 | Smaller | + | Decrement |
| 3 | Smaller | − | Decrement |
| 4 | Greater | − | Increment |

In preferred embodiments, the I-V relationship is non-linear. In some embodiments, the non-linear I-V relationship is characterized by a knee (i.e., a change in slope), stationary point (i.e., a local maximum or minimum), saddle point, or inflection point at or near the relatively optimal operating point. In one embodiment, the knee region may be characterized by a change in the magnitude of the slope, while an inflection point may be characterized by a change in the sign (polarity) of the slope. In the example discussed in reference to FIG. 3A, the knee is in the region of operating points 320, 330, and 340, and the slope of the I-V curve below the knee (at lower operating voltages) is higher than the slope above the knee (at higher operating voltages). Thus, when applied, the rules in Table 1 drive the operating point to the knee region (the relatively optimal operating point) in response to the different slope values above and below the relatively optimal operating point. In other words, when the slope value decreases, the system is above the relatively optimal operating point and when the slope value increases, the system is below the relatively optimal operating point.

Figure 3C:
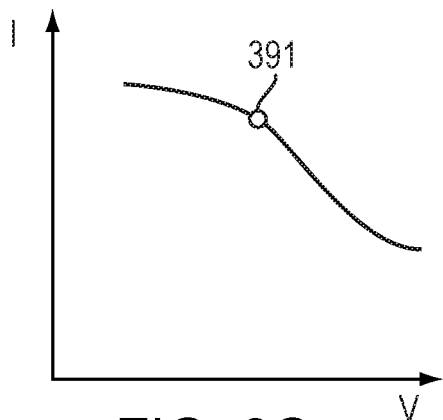
Figure 3D:
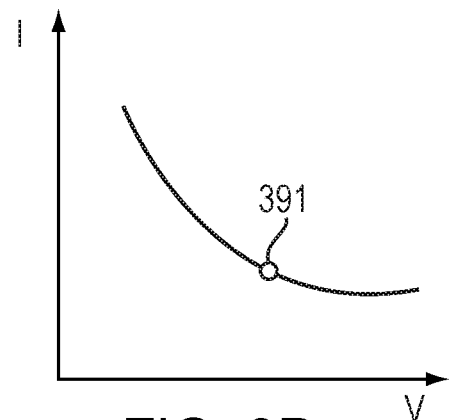
Figure 3E:
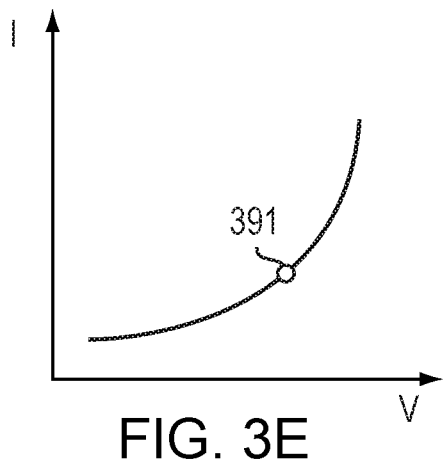

It should be understood that this approach may be generalized beyond the examples discussed in reference to FIGS. 3A and 3B and Table 1. FIGS. 3C-3E show additional examples of non-linear I-V relationships and relatively optimal operation points 391. For example, the I-V relationship shown in FIG. 3C is similar to that shown in FIG. 3A, but in this case the slope of the I-V curve below the knee (at lower operating voltages) is less than the slope above the knee (at higher operating voltages).

Figure 3F:
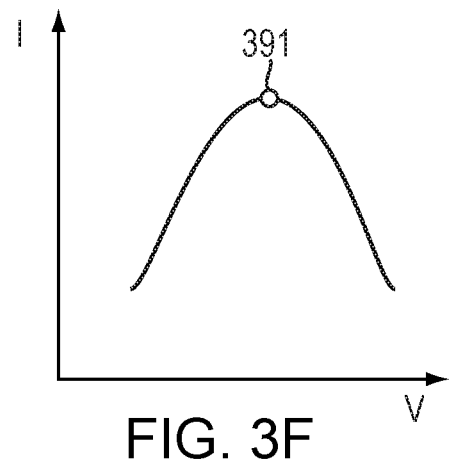
Figure 3G:
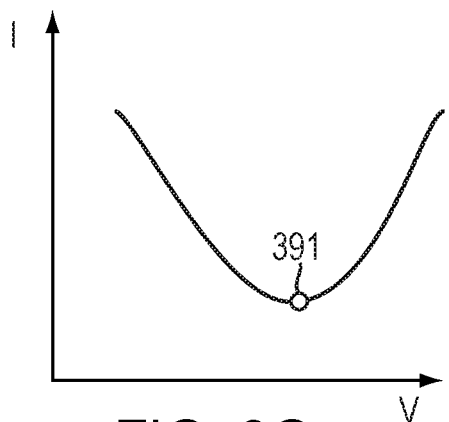

While FIGS. 3A-3E show examples having a knee region, this is not a limitation of the present invention, and in other embodiments other features may be used to identify the relatively optimal operating point. FIGS. 3F and 3G show two examples, where the relatively optimal operating point 391 corresponds to a peak and a valley respectively (i.e., to stationary points). At these points the polarity of the slope changes sign. In other words, the curve changes from being concave up to concave down. The polarity of the slope of the I-V relationship should not be confused with the sign of the difference in Table 1. The sign of the difference in Table 1 refers to the sign of the difference of currents and is used as part of the determination to increment or decrement the applied voltage.

Figure 3H:
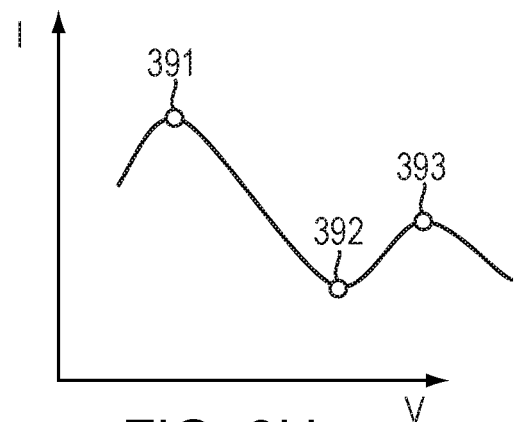

While FIGS. 3A-3G show examples that have one feature defining the relatively optimal operating point, this is not a limitation of the present invention, and in other embodiments the I-V relationship may have more than one possible knee, stationary point, or inflection point, such as points 391, 392, 393 in FIG. 3H. In this case additional rules may be configured to distinguish the different and/or desired operating points, for example including rules based on the absolute or relative magnitudes of the current value. The examples shown in FIGS. 3A-3H are not meant to be limiting, and the methods and systems described herein may be applied to systems characterized by a non-linear I-V relationship.

While the discussion above has been in reference to the I-V curve of an electrical load, this approach may be applied to other control systems, where the parameters are not the applied voltage and resulting current determined from the I-V relationship. In other words, the methods and systems described herein may be applied to systems characterized by a non-linear load curve that defines the relationship of one or more inputs and one or more responses. For example, other types of systems or relationships that the present invention may be applied to include (a) a position control system, where the response is the position and the input is a signal to adjust the position, (b) a pressure control system, for example to apply and control pressure in a mold, reaction chamber or the like, where the response is the pressure and the input is the signal to adjust the pressure, (c) a temperature control system, where the response is the temperature and the input is the signal to adjust the pressure, (d) a humidity control system, where the response is the humidity and the input is the signal to adjust the humidity, (e) a flow control system, where the response is the flow of a fluid and the input is the signal to adjust the flow, (f) a lighting control system, where the response is a lighting characteristic such as intensity, luminance, illuminance, color temperature, or the like, and the input is the signal to adjust the lighting characteristic.

In general, the approach to applying embodiments of the present invention is to determine the load relationship (between one or more inputs and one or more outputs), determine the relatively optimal operating point and determine a set of rules based on changes to the input(s) to drive the system to its relatively optimal operating point. The rules may then be embodied in hardware and/or software or other means to effect changes in the system and provide control to the relatively optimal operating point. As stated herein, an advantage of this is that in preferred embodiments it provides automatic optimization to the relatively optimal operating point for a distribution of systems, where the relatively optimal operating point may vary because of variations in component values, aging, environmental conditions, or the like.

The value of DI, the predetermined current difference value, may be influenced by a number of factors. For example, in one embodiment, DI may be set to a relatively small value in order to result in a relatively small range of operation about the operating point. For example, in the system described in reference to FIGS. 2 and 3A, DI may be less than about 1 mA, or less than about 0.5 mA, or less than about 0.1 mA. In some embodiments DI may be less than 20% of the value of the current at the operating point, or less than about 10% of the value of the current at the operating point, or less than about 2% of the value of the current at the operating point. However, the specific value of DI is not a limitation of the present invention, and in other embodiments DI may have any value.

As shown in FIG. 3A, the current-voltage curve may have a knee or bend in it, i.e., the region near points 320, 330, and 340. While point 330 identifies the 5 mA design point, it is important to note that the voltage value at which this occurs may be different for different light-emitting strings, either within the system or between different systems, resulting, for example, from manufacturing and/or operational variations. A key aspect of some embodiments of this invention is the use of the signature of the I-V curve of the load to determine and operate at a relatively optimal operating point. While FIG. 3A shows one example of an I-V curve, the shape or current or voltage values associated with the I-V curve shown in FIG. 3A are not limitations of the present invention, and in other embodiments the I-V curve may have any shape.

FIG. 3A shows how an embodiment of the present invention operates in a stable regime, where in this context stable means that the I-V curve is relatively fixed and does not shift or change shape. However, in some embodiments, the system may not be stable. For example, manufacturing variations may result in different I-V relationships for different versions of the same system, for example, because of variations in component values within the system. Also, the I-V relationship may change with time, for example as a result of changes in operating conditions (e.g., sudden or frequent system on/off cycles), environmental factors such as temperature, aging, component failure, or the like. Embodiments of the present invention accommodate these variations and operate at the relatively optimal operating point.

In the example of a light-emitting system, in some embodiments the curve relating operating current to applied voltage may shift to the left or right, while maintaining essentially the same shape. For example, components such as LEDs have manufacturing tolerances and there may be a distribution in characteristics (e.g., forward voltage) over the manufacturing output. This means that the sum of the forward voltage of all of the LEEs in different light-emitting strings may have different values, and thus a different minimum applied voltage may be required to achieve the desired current flow. For example, if the sum of the forward voltage of all of the LEEs in different light-emitting strings increases, then the minimum applied voltage to achieve the desired current increases. Conversely, if the sum of the forward voltage of all of the LEEs in different light-emitting strings decreases, then the minimum applied voltage to achieve the desired current decreases.

In addition to manufacturing tolerances (e.g., on all components in the system, for example the components making up CCE 270, not just LEEs), operational variations may also change the value of the string voltage (where the string voltage includes or consists essentially of the sum of the forward voltage of all of the LEEs in a light-emitting string as well as the voltage drop across CCE 270 and any other elements that may be in the light-emitting string). For example, as the temperature decreases, in embodiments where LEEs 110 include or consist essentially of LEDs, the forward voltage of LEEs 110 may increase. Thus in some embodiments, as the temperature decreases, the minimum applied voltage to achieve the desired current increases.

FIG. 3B shows three I-V relationships for a lighting system. Curve 302 illustrates the same relationship as the curve in FIG. 3A. Curve 306 shows an example of an I-V relationship where the string voltage is relatively smaller than that for curve 302 while curve 308 shows an example of an I-V relationship where the string voltage is relatively larger than that for curve 302.

If the system is initially operating at point 330 on curve 302 and there is a change in operational parameters to curve 308, the voltage initially remains at $V_{330}$; however, the current decreases to that associated with point 360 on curve 308 and the system is not operating at the relatively optimal operating point. At the next voltage increment time the system will act to move the voltage back to the relatively optimal operating point, which for curve 308 is point 370, in a manner substantially the same as described in reference to FIG. 3A.

If the system is initially operating at point 330 on curve 302 and there is a change in operational parameters to curve 306, the voltage remains at $V_{330}$; however, the current increases to that associated with point 390 on curve 306 and the system is not operating at the relatively optimal operating point. At the next voltage increment time the system will act to move the voltage back to the relatively optimal operating point, which for curve 306 is point 380, in a manner substantially the same as described in reference to FIG. 3A.

As discussed herein, in some embodiments such operational changes may result from environmental factors, such as a change in ambient temperature due to weather, heating or air conditioning systems, or the like. For example, systems may be installed in different environments having relatively well controlled, but different ambient temperatures, such as in an office space or home, or in a freezer case. Alternately, systems may be installed in different environments where the temperature is not well controlled, for example non-climate controlled warehouses, outdoor lighting, etc. In other situations the I-V curve may shift because of self-induced effects. For example, when a system is off, it may have a temperature close to that of the ambient temperature. When it is turned on, the various components begin to heat up, raising their temperature and possibly shifting the I-V curve. Where the system includes LEDs, the forward generally voltage drops as the LEDs heat up, resulting in a shift of the I-V curve, for example from that of curve 308 to curve 302 in FIG. 3B. In other situations, manufacturing variations in the actual value of component parts, for example LEEs 110 and/or the components of CCE 270, may result in a range of I-V curve positions and shapes, for the complete manufacturing distribution of the system.

Figure 4:
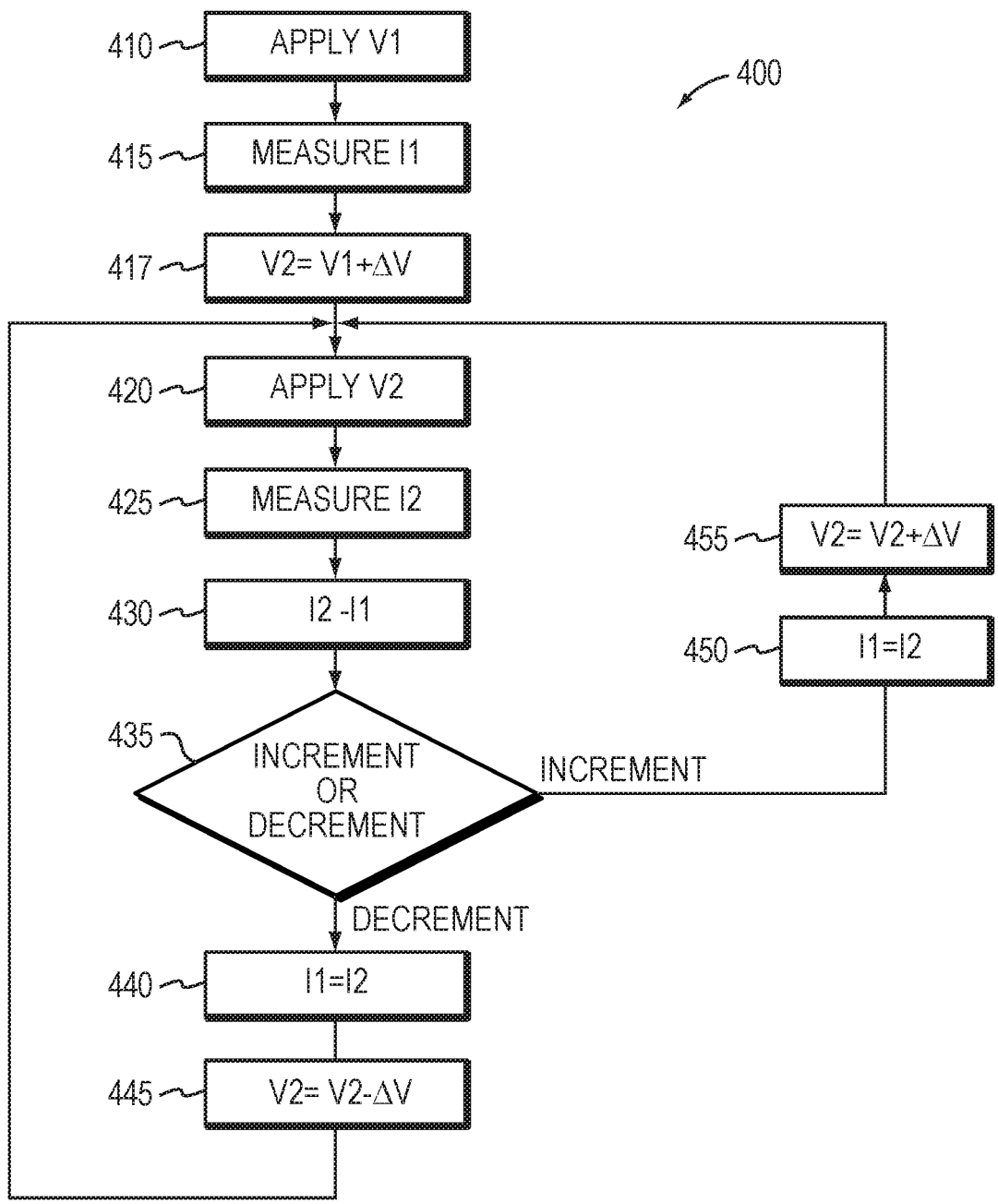
FIGS. 4 and 5 are flowcharts of illumination system operation in accordance with various embodiments of the invention.

FIG. 4 depicts a flowchart of an exemplary process 400 in accordance with various embodiments of the invention. Process 400 is shown having eleven steps; however, this is not a limitation of the present invention, and in other embodiments the invention has more or fewer steps and/or the steps may be performed in different order. In step 410, a voltage V1 is applied to the load. In step 415, the current I1, for an applied V1, is measured. In step 415, the voltage V1 is incremented to voltage V2. In step 420, the voltage V2 is applied to the load. In step 425, the current I2, for an applied V2, is measured. In step 430, the current I2 is compared to current I1. In step 435, a decision is made whether to increment or decrement the voltage, for example based on the rules of Table 1. If the decision is to increment the voltage, the process moves to step 450. In step 450, the value of current I1 is set to the value of current I2 (note that this step is for calculation or comparison purposes and is not physically setting a current value in the actual system). In step 455, the voltage V2 is incremented. After step 455, the process returns to step 420 where the new value of V2 is applied to the load, a new value of current I2 is measured (step 425) and the difference between the new values of current I2 and current I1 (which is the previous current I2 value) is determined (step 430). If in step 435 the decision is to decrement the voltage, the process moves to step 440. In step 440, the value of current I1 is set to the value of current I2. In step 455, voltage V2 is decremented. After step 445, the process returns to step 420 where the new value of voltage V2 is applied to the load, a new value of current I2 is measured (step 425) and the difference between the new value of current I2 and current I1 (which is the previous current I2 value) is determined (step 430). Note that in various embodiments it is not necessary to know (or measure) the exact value of the applied voltage after the system is started up, as the next applied voltage is modified relative to its previous value without measurement of its actual value.

Figure 5:
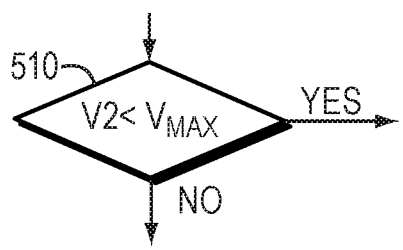

In some embodiments of process 400, the system starts with an initial voltage V1 that is known to be below the desired operating voltage point, for example point 310 in FIG. 3A. In this way the system may be configured to not exceed a certain operating voltage limit. For example a UL Class 2 certification requires the operating voltage to not exceed 60 V under operating conditions. By starting the system with voltage V1<60 V this requirement may be satisfied. An additional step, for example just prior to step 420 may include a check to ensure that the applied voltage is less than a certain value, for example 60 V in a UL Class 2 system. For example, FIG. 5 shows one embodiment of an optional step to check the value of the voltage to be applied. In some embodiments this step 510 may be positioned just prior to step 420 in FIG. 4. (A similar check may also be made before step 410, upon initialization of the system, if desired.) In step 510, the value of the voltage V2 to be applied is compared to a maximum allowable value. For example in some embodiments of a UL Class 2 system where the maximum allowable voltage is 60 V, $V_{MAX}$ may be set to a value slightly less than 60 V, for example 59 V or 58 V or 57 V or the like. If the value of the voltage V2 that is to be applied is less than $V_{MAX}$ the process proceeds normally. If the value of the voltage V2 that is to be applied is equal to or larger than $V_{MAX}$ the process moves to a different branch. Depending on the design, various actions may be taken. In one embodiment, the value of voltage V2 is limited to $V_{MAX}$ or some other value less than V. In one embodiment, the system is instructed to shut down. The action taken upon voltage V2 being larger than $V_{MAX}$ is not a limitation of the present invention.

As will be understood from the description herein, a key aspect of some embodiments of this invention is that it is not necessary to know, either in advance or in real time, the "desired" applied voltage. The system uses the I-V signature to determine the relatively optimal applied voltage without knowing its specific value.

Figure 6A:
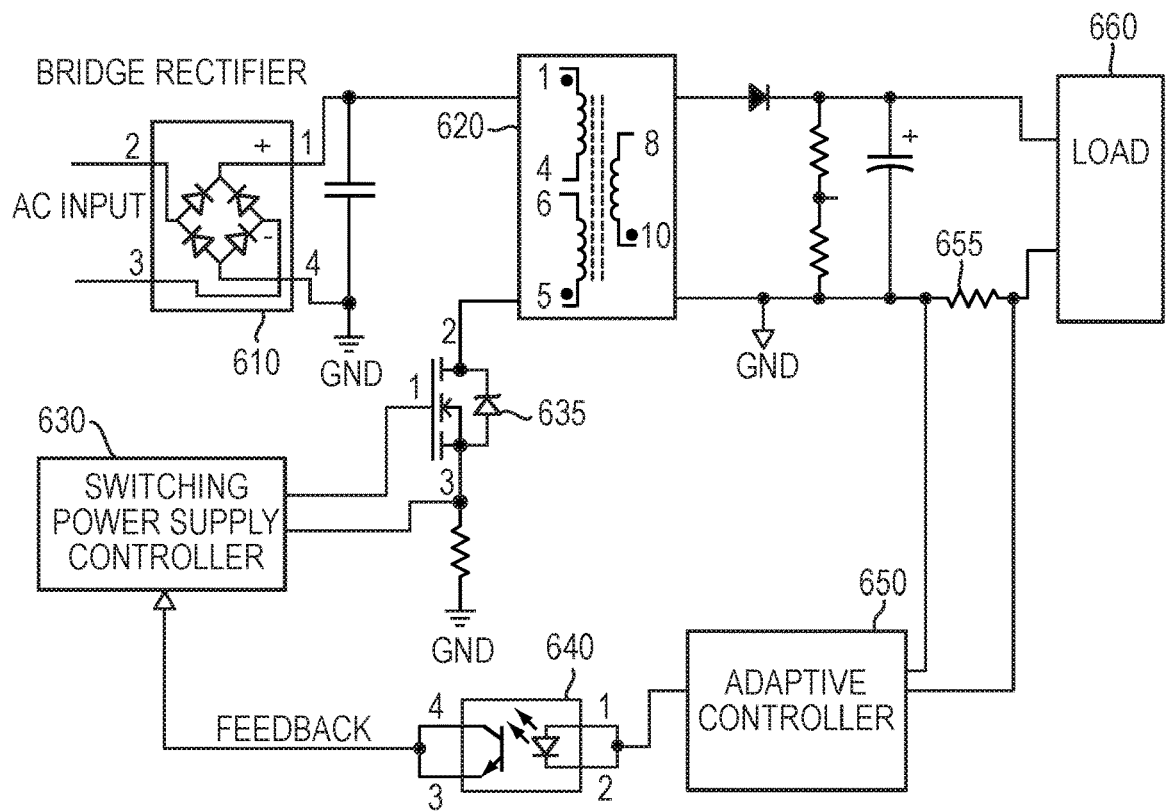
FIGS. 6A, 6B, and 7 are circuit diagrams of illumination systems in accordance with various embodiments of the invention.

Referring back to FIG. 2A, an example of a block diagram of a circuit embodying the principles of the present invention is shown. As will be understood by those skilled in the art, there are many types or configurations of variable voltage sources that may be used for variable voltage source 230 in FIG. 2A. FIG. 6A shows a circuit block diagram of one exemplary embodiment of the present invention that includes a flyback switching power supply. The circuit in FIG. 6A includes or consists essentially of a bridge rectifier 610, a switching and isolation transformer 620, a switching power supply controller 630, switching MOSFET 635, an optoisolator (or "optical isolator") 640, and an adaptive controller 650. In one embodiment, the circuit operates as follows; adaptive controller 650 determines the voltage to be applied to a load 660. A signal is sent from adaptive controller 650 through optoisolator 640 to switching power supply controller 630 to set the voltage applied to load 660 to the desired value. Switching power supply controller 630 sets the modulation frequency of switching MOSFET 635, driving the duty cycle of switching and isolation transformer 620 and resulting in the desired voltage being applied to load 660. The load current is measured by means of a shunt resistor 655. The adaptive controller follows a process to adjust to a relative optimum output voltage, as discussed herein, for example in relationship to the description of FIG. 4 and/or Table 1.

Figure 6B:
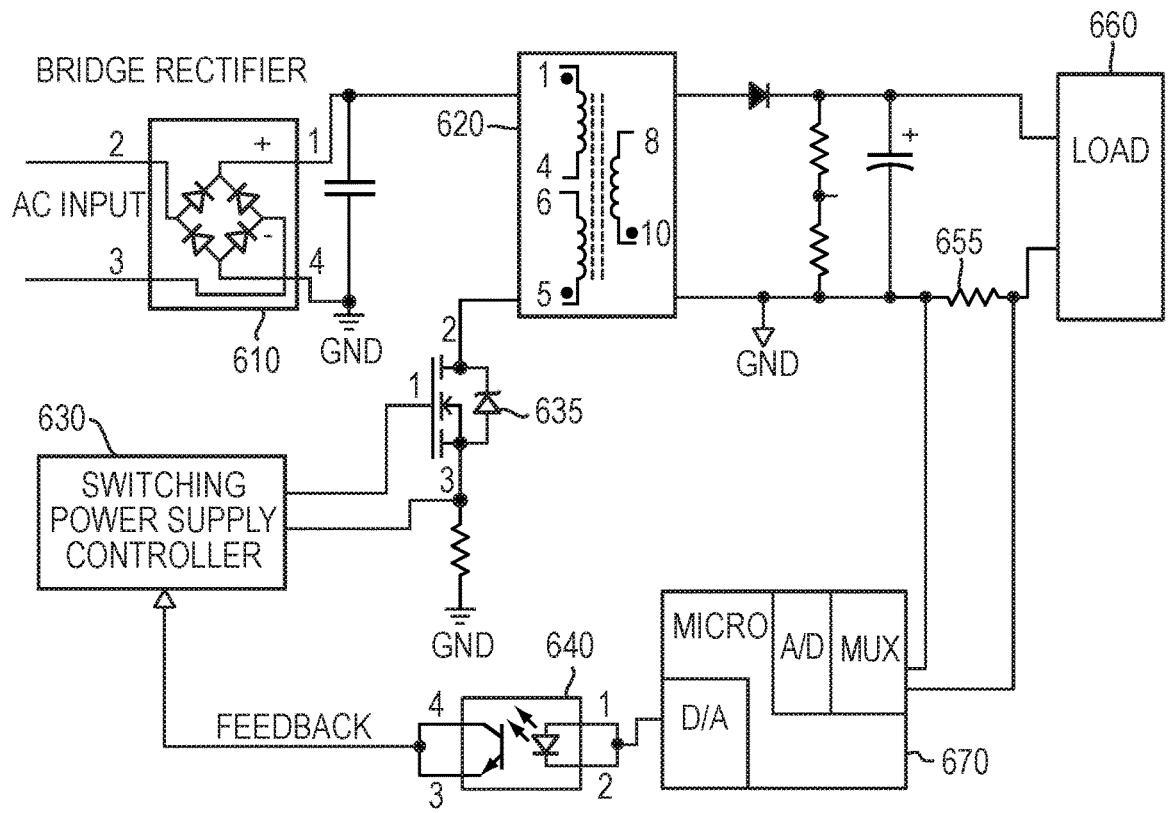

FIG. 6B shows an example of an embodiment of the circuit block diagram of FIG. 6A in which adaptive controller 650 includes or consists essentially of a microcontroller 670. In one embodiment, microcontroller 670 reads the applied current by means of shunt resistor 655 (through an optional multiplexer) and an analog to digital (A/D) converter within or external to microcontroller 670. Microcontroller 670 outputs an analog signal by means of a digital to analog (D/A) converter (within or external to microcontroller 670), which is representative of the desired applied voltage. This analog signal is applied to optoisolator 640 to set the desired output voltage to the load 660. Microcontroller 670 is programmed, for example in software or firmware, to carry out the desired process, for example that in relation to FIG. 4 and/or Table 1.

The microcontroller 670 may be a general-purpose microcontroller, but depending on implementation may alternatively be a microprocessor, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of embodiments of the invention. Moreover, some of the functions of microcontroller 670 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to microcontroller 670. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

Figure 7:
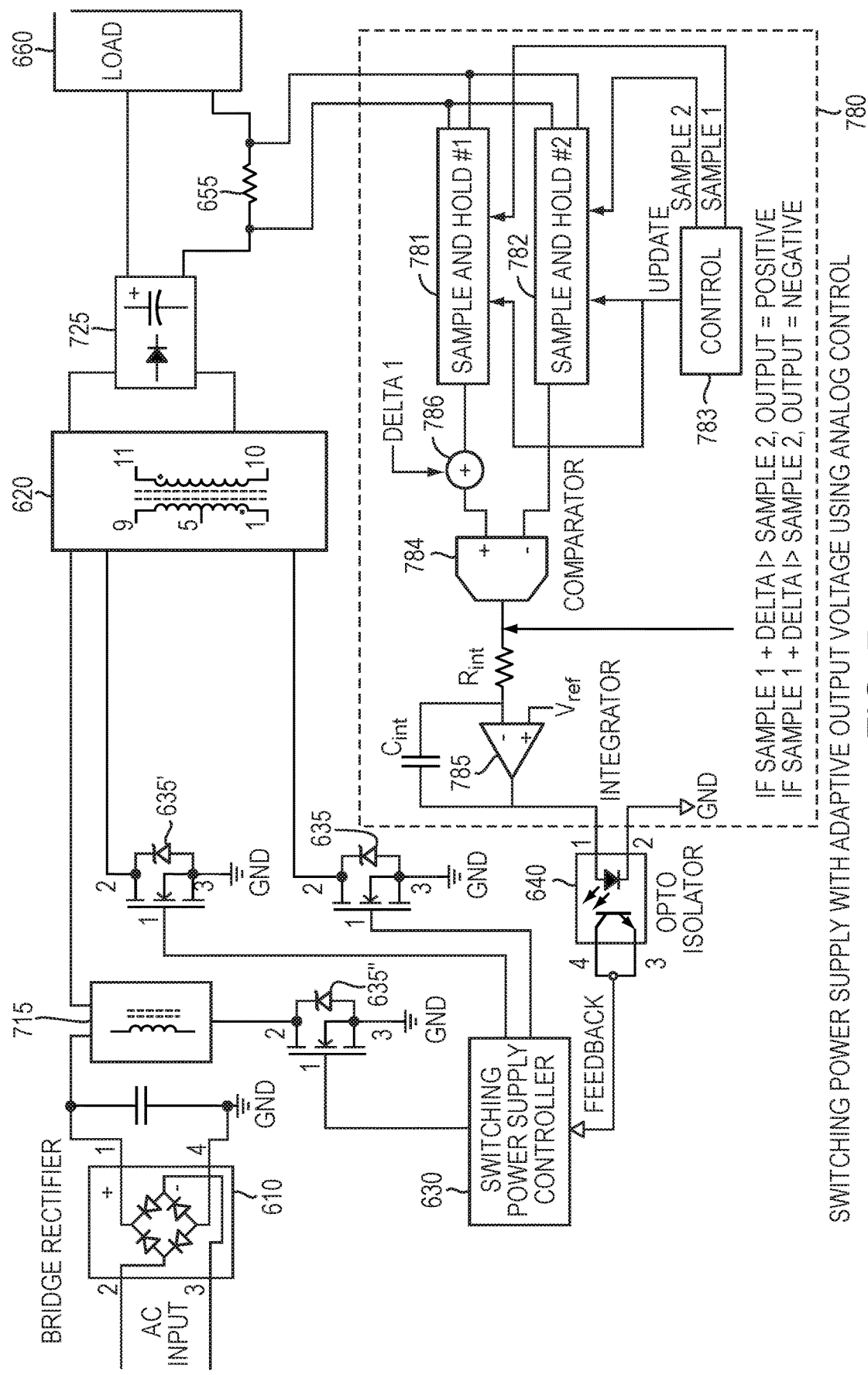

FIG. 7 shows an example of an embodiment of the circuit block diagram of FIG. 6A in which adaptive controller 650 includes or consists essentially of an analog circuit 780. Also shown in FIG. 7 is an optional power factor correction stage 715 and an optional rectification and smoothing stage 725. The embodiment shown in FIG. 7 also shows three switching transistors 635, 635', and 635"; however, this is not a limitation of the present invention, and in other embodiments fewer or more switching transistors 635 may be utilized. In some embodiments, these are controlled by switching controller 630. In the depicted embodiment, the value of the load current is sampled across shunt resistor 655 by two conventional sample-and-hold circuits 781, 782. The sample-and-hold circuits sample the load current alternately, the timing of the alternate sampling being controlled by sample-and-hold controller 783. The difference between the two current levels sampled at successive times is determined by a comparator 784 and sent to an integrator 785 that drives optoisolator 640. In operation, the comparator 784 determines the difference between the successive current values measured by sample-and-hold circuits 781, 782. In some embodiments, a small offset, delta 786, is added to (via, e.g., a voltage adder) the value of the output of sample-and-hold 781. In some embodiments, delta 786 serves the same purpose as the predetermined value DI as discussed herein. The difference between [sample-and-hold 781+delta 786] and sample and hold 782 is sent to comparator 784. If [sample and hold 781+delta 786] is greater than sample-and-hold 782, or if sample-and-hold 781−sample-and-hold 782 is greater than delta 786, the output of comparator 784 is positive, which then drives integrator 785 output positive, which increases the voltage to load 660. If [sample-and-hold 781+delta 786] is less than sample-and-hold 782, or if sample-and-hold 781−sample-and-hold 782 is less than delta 786, the output of comparator 784 is negative, which then drives integrator 785 output negative, which decreases the voltage to load 660. In this way, if the change in load current from one sample period to the next is greater than delta 786, the voltage is changed. If the change in load current from one sample period to the next is less than delta 786, integrator 785 drives the load voltage lower, such that at the next or successive sampling interval, the change in load current between sample periods is greater than delta 786, driving the voltage back up. In this way the load voltage oscillates around the relative optimal operating point.

The systems shown in FIGS. 6A-6C and FIG. 7 show two embodiments of circuits that may be used to embody elements of the present invention, although alternative systems with similar functionality are also within the scope of the invention. As will be understood by those skilled in the art, there are many electrical topologies for switching power supplies, and the specific topology of the power supply is not a limitation of the present invention.

Figure 8:
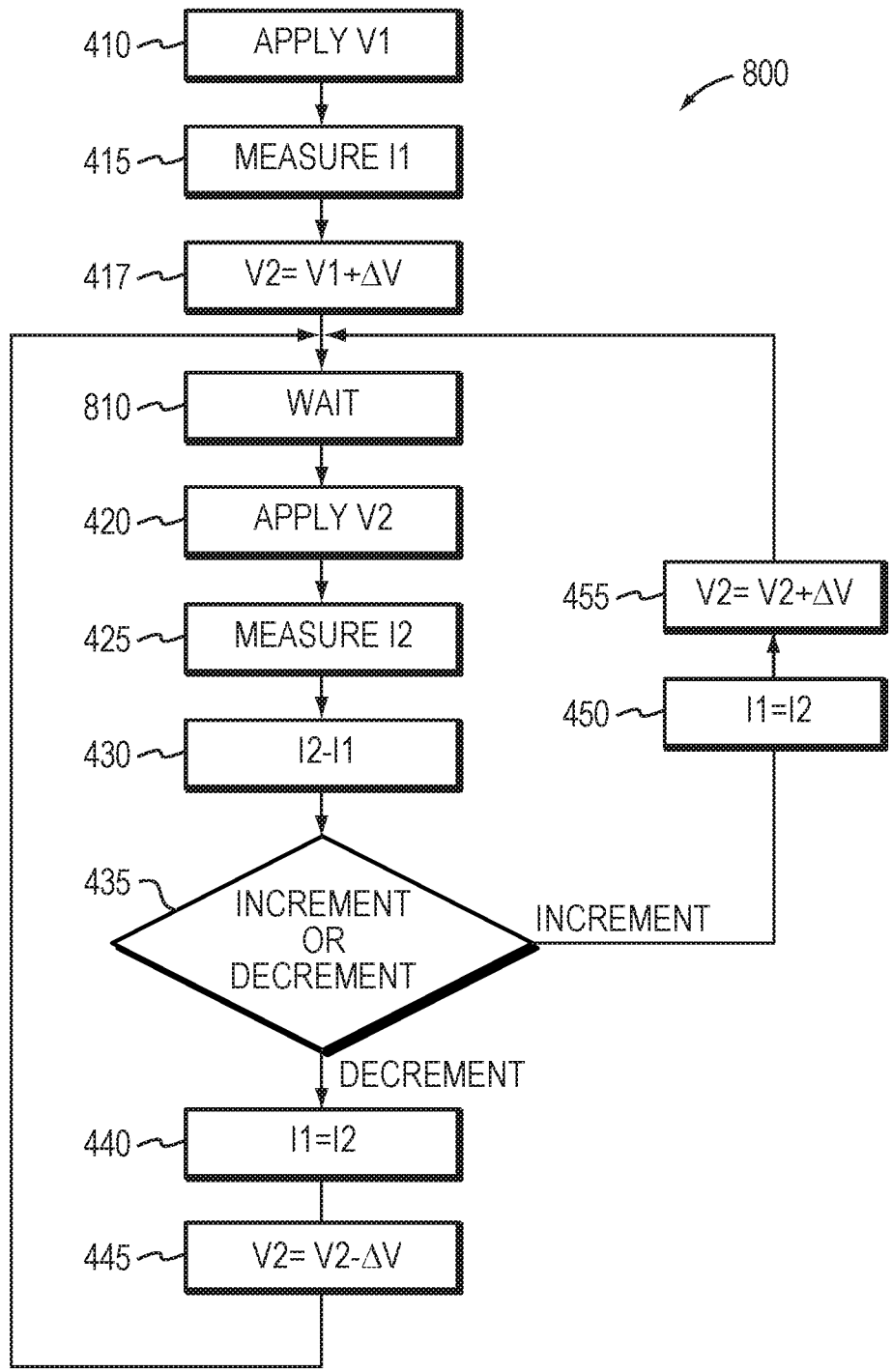
FIGS. 8 and 9 are flowcharts of illumination system operation in accordance with various embodiments of the invention.

As will be recognized from the description in reference to FIGS. 3A and 4, in some embodiments once the system is near its relative optimal operating point and the I-V relationship is substantially stable, the adaptive power system may cycle back and forth about the relative optimal operating point. For example, in the example in reference to FIG. 3A, the operating point cycles between points 320 and 340 through point 330. In some embodiments, a fixed or variable wait time may be added to the process, for example the process shown in reference to FIG. 4, to reduce the cycle frequency. FIG. 8 is a flowchart of an exemplary process 800 in accordance with various embodiments of the invention. Process 800 is similar to process 400 shown in FIG. 4, with the inclusion of a wait step 810 just before step 420, Apply V2. Process 800 is shown having twelve steps; however, this is not a limitation of the present invention, and in other embodiments the invention has more or fewer steps and/or the steps may be performed in different order. In some embodiments, wait step 810 may be fixed, for example wait step 810 may range from about 10 milliseconds (ms) to about 10 seconds, although the specific value of a fixed wait time is not a limitation of the present invention. In some embodiments, wait step 810 may be variable. For example, in some embodiments wait step 810 may be relatively short during start-up of the system and may increase with time. For example, in some embodiments wait step may have a value between about 1 ms and about 100 ms during the start-up time and may have a wait step value between about 100 ms and about 1 hour or 1 day or more during operation. In some embodiments, the start-up period may be in the range of about 10 seconds to about 5 minutes (from start-up of the system). However, the wait times during start-up and operation, as well as the start-up period are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize after being turned on.

In some embodiments, the ΔV voltage increment may be fixed while in other embodiments the ΔV increment may be variable. In some embodiments, the ΔV increment may be in the range of about 0.05 V to about 5 V; however, the ΔV increment value is not a limitation of the present invention. In some embodiments, the ΔV increment is determined as a percentage of the operating voltage. For example, ΔV may be in the range of about 10% of the operating voltage to about 0.01% of the operating voltage; however, the ΔV increment value as a percentage of the operating voltage is not a limitation of the present invention. In some embodiments, the ΔV increment may be relatively small during start-up of the system and may increase with time. For example, in some embodiments the ΔV increment may have a value between about 0.05 V and about 0.25 V (or between about 0.01% to about 0.5% of the operating voltage) during the start-up time and may have a ΔV increment value between about 0.25 V and about 1 V (or between about 0.5% to about 2% of the operating voltage) during operation. In some embodiments, the ΔV increment may have a value between about 0.25 V and about 1 V (or between about 0.5% to about 2% of the operating voltage) during the start-up time and may have a ΔV increment value between about 0.05 V and about 0.25 V (or between about 0.01% to about 0.5% of the operating voltage) during operation. In some embodiments the start-up period may be in the range of about 10 seconds to about 5 minutes (from start-up of the system). However, the wait times during start-up and operation, as well as the start-up period, are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize (i.e., reach an approximately constant temperature given ambient conditions and heat generated by the system itself) after being turned on.

In some embodiments, the pre-determined value DI used to evaluate the current difference $I_2-I_1$ may be fixed, while in other embodiments it may be variable. In some embodiments, the pre-determined value DI used to evaluate $I_2-I_1$ may be in the range of about 0.01 mA to about 1 mA; however, the pre-determined value DI used to evaluate $I_2-I_1$ is not a limitation of the present invention. In some embodiments, DI may be about or less than 20% of the value of the current at the operating point, or about or less than about 10% of the value of the current at the operating point, or about or less than about 2% of the value of the current at the operating point. However, the specific value of DI is not a limitation of the present invention, and in other embodiments DI may have any value.

For example, in some embodiments the pre-determined value used to evaluate the current difference $I_2-I_1$ may be variable. For example in one embodiment, the current difference $I_2-I_1$ may be relatively small during start-up of the system and may increase with time. For example, in some embodiments the pre-determined value used to evaluate $I_2-I_1$ may have a value between about 0.1 mA and about 1 mA during the start-up time and may have a value between about 0.01 mA and about 0.1 mA during operation. In some embodiments, the start-up period may be in the range of about 10 seconds to about 5 minutes (from start-up of the system). However, the pre-determined value used to evaluate $I_2-I_1$ during start-up and operation, as well as the start-up period, are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize after being turned on. Table 2 shows an example of a two-level system with different possibilities of the wait time, $\Delta V$ increment and/or pre-determined value used to evaluate $I_2-I_1$ for two different periods, start-up and operation. The values discussed with respect to this example and in connection with Table 2 are exemplary values; the specific values are not limitations of the present invention.

TABLE 2

| Period | Wait Time (s) | $\Delta V$ increment (V) | Pre-determined I2-I1 value (mA) |
|---|---|---|---|
| Start-up | 0.001-0.1 | 0.05-0.25 | 0.1-1.0 |
| Operation | 0.1-3600 | 0.25-1.0 | 0.01-0.1 |

While the discussion above relative to different wait times, $\Delta V$ increments, and the pre-determined value used to evaluate $I_2-I_1$ has been with reference to a two-level system (that is a system with two periods having different characteristics), this is not a limitation of the present invention, and in other embodiments more than two levels may be utilized. While the discussion above relative to two or more periods has been with reference to wait times, $\Delta V$ increments, and the pre-determined value used to evaluate $I_2-I_1$, this is not a limitation of the present invention, and in other embodiments other parameters may have different values during these periods as well. In some embodiments, only one or several parameters have different values during different periods.

In some embodiments, various adaptive parameters may have discrete values, while in other embodiments they may vary continuously. Here "adaptive parameters" are parameters that control or direct the operation of the adaptive power supply system including but not limited to wait times, $\Delta V$ increments, and the pre-determined value used to evaluate $I_2-I_1$.

Figure 9:
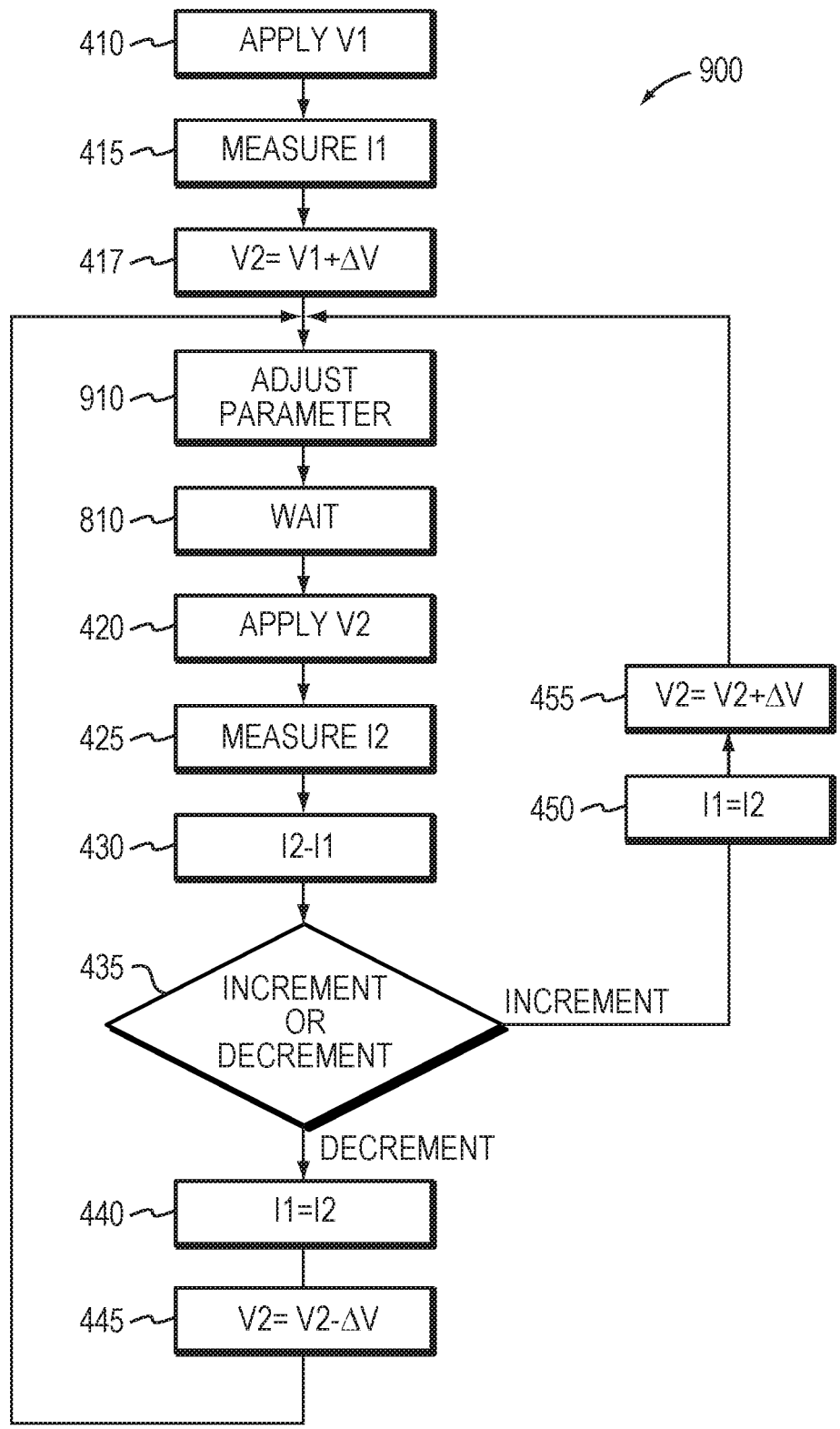

In some embodiments, adaptive parameters may be changed dynamically, that is for example in response to various states of the process, as opposed to being changed by time period, as discussed above. For example, FIG. 9 depicts a flowchart of an exemplary process 900 in accordance with various embodiments of the invention. Process 900 is similar to process 800 shown in FIG. 8; however, in process 900 one or more parameters (for example Wait Time, $\Delta V$, DI) may be changed based on a determination in an adjust-parameter step 910. For example, in an embodiment in which the system is relatively stable and is cycling back and forth around a central current-voltage point, as described in reference to FIG. 3C, step 910 may count how many times the system has cycled back and forth around substantially the same points. When the cycle count reaches a maximum, the wait time may be changed, for example increased, to reduce the amount of cycling. In another example, when the system is relatively stable, the value of $\Delta V$ may be reduced to more closely approach the relatively optimal operating point. In another example, DI may be changed. For example, DI/$\Delta V$ may be considered to be a measure of the slope of the I-V relationship, and in some embodiments, DI may be modified to improve the operation of process 900, for example to better match the measured change in current as a response to $\Delta V$ changes to the slope of the I-V curve. The forgoing examples are for a relatively stable system. If there is a shift in the system relationship, for example as described in reference to FIG. 3B, then there is a disruption in the response cycle described in reference to FIG. 3C and in some embodiments, in step 910 one or more parameters are set to their default value or set to another value dependent on the nature and extent of the disruption. The number and function of the steps shown in process 900 is exemplary and are not a limitation of the present invention, and in other embodiments the invention has more or fewer steps and/or the steps may be performed in different order.

Example 1

In this example, the number of stable cycles (shown in FIG. 3C) is counted. For every X cycles around a relatively stable operating point (X is an integer, for example 10, 50, 100, or another number), the wait time increases. For example, in one embodiment the wait time may double after X cycles. Taking the case where X is 50, if the system cycles 50 times around the operating point in a relatively stable fashion, the wait time doubles. If it cycles another 50 times around the operating point in a relatively stable fashion, the wait time doubles again (4× the original value). As long as the system is stable, the wait time increases, reducing the cycle frequency. If the system detects a different pattern (e.g., current-voltage relationship), then step 910 sets the wait time back to the starting default value. In the examples below, the specific values are representative and other values may be used.

Example 2

In this example, the number of stable cycles (shown in FIG. 3C) is counted. For every X cycles around a relatively stable operating point (X is an integer, for example 10, 50, 100, or another number), $\Delta V$ is decreased. For example, in one embodiment the $\Delta V$ is decreased by 10%, 25%, 50%, or some other amount. Taking the case where X is 50 and the $\Delta V$ decrease is 10%, if the system cycles 50 times around the operating point in a relatively stable fashion, then $\Delta V$ is set to 0.9$\Delta V$. If it cycles another 50 times around the operating point in a relatively stable fashion, $\Delta V$ decreases again to 0.81$\Delta V$. As long as the system is stable, $\Delta V$ decreases. This permits the system to take finer and finer voltage steps to more closely approach the relatively optimal operating point. In most embodiments, it is preferable to set a minimum $\Delta V$ value. If the system detects a different pattern (e.g., current-voltage relationship), then step 910 sets $\Delta V$ back to the starting default value.

Example 3

In this example the number of stable cycles (shown in FIG. 3C) is counted. For every X cycles around a relatively stable operating point (X is an integer, for example 10, 50, 100, or another number), ΔV is decreased until a minimum ΔV value is reached, for example 5 cycles of monotonic ΔV reduction. After that, as long as the system is stable, the wait time is then increased. For example, in one embodiment the ΔV may be decreased by 10% in each of 5 steps. Thus, in a relatively stable system the ΔV values are ΔV, 0.9ΔV, 0.81ΔV, 0.73 ΔV and 0.66ΔV. If the system goes through 5 cycles of monotonic ΔV reduction, the value of ΔV will be 0.59ΔV and will remain fixed as long as the system is stable. If the system is stable for another 50 cycles, then the wait time is increased, for example the wait time doubles. If it cycles another 50 times around the operating point in a relatively stable fashion, the wait time doubles again (4× the original value). As long as the system is stable, the wait time increases, reducing the cycle frequency. If the system detects a different pattern, then step 910 sets ΔV and the wait time back to the starting default value.

The discussion with respect to FIG. 9 has provided an example where the wait time WAIT is increased; however, this is not a limitation of the present invention, and in other embodiments the wait time WAIT may be decreased or decreased and increased at different times by any amount. The discussion with respect to FIG. 9 has provided an example where the adaptive parameter WAIT is dynamically changed during process 900; however, this is not a limitation of the present invention, and in other embodiments other adaptive parameters, for example ΔI and ΔV, may also be changed. The discussion with respect to FIG. 9 has provided an example where one adaptive parameter (WAIT) is dynamically changed during process 900; however, this is not a limitation of the present invention, and in other embodiments more than one adaptive parameter may be changed dynamically, or one or more adaptive parameters may be fixed or one or more adaptive parameters may be changed based on time periods.

Figure 10:
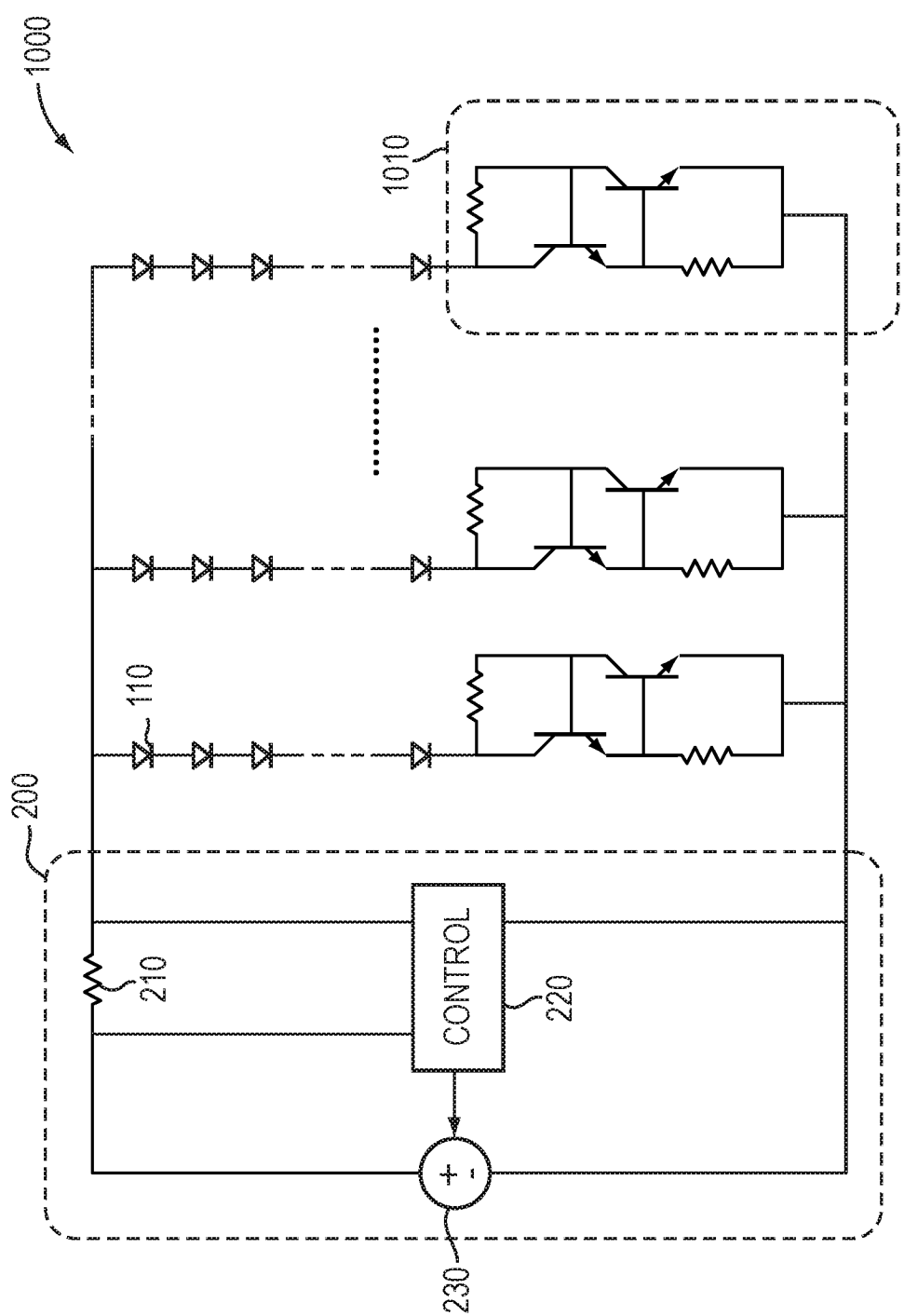
FIG. 10 is a partial circuit diagram of an illumination system in accordance with various embodiments of the invention.

FIG. 10 shows an example of a lighting system 1000 incorporating an adaptive power system 200. Similar to the system shown in FIG. 2A, adaptive power system 200 includes or consists essentially of variable voltage supply 230, controller 220, and a current sensing system 210 represented in FIG. 10 as a current sense resistor. Adaptive power system 200 powers a light-emitting array that includes or consists essentially of at least one string of series-connected LEEs 110, where each string also includes a CCE 1010. In the example shown in FIG. 10 the light-emitting array includes or consists essentially of two or more strings of series-connected LEEs 110, and the strings are electrically coupled in parallel. In this embodiment, CCE 1010 includes or consists of two resistors and two transistors, for example as shown in connection with FIG. 2C; however, this is not a limitation of the present invention, and in other embodiments CCE 1010 may include or consist of one or more passive components, one or more active components, a combination of active and passive elements, an integrated circuit, or any other mechanism for controlling the current. In operation CCEs 1010 act to control the current through each string at a particular design point, relatively independent of the voltage value applied to the string.

As may be seen from FIG. 10, the current sensed by resistor 210 is approximately the sum of the current through all of the strings. While this value changes with the number of strings incorporated into the system, the signature or shape of the I-V relationship typically does not substantially change with the number of strings incorporated into the system. As has been discussed herein, the signature of the I-V relationship, and not its absolute value, is used to drive the voltage to the relatively optimal operating point or relative optimum operating voltage. Thus, systems may include or incorporate one or more light-emitting strings or one or more groups of light-emitting strings, each having somewhat different characteristics, for example the forward voltage of LEEs 110, and the adaptive power system 200 will adjust and control the voltage to the relatively optimal operating point. In operation, additional light-emitting strings or groups of light-emitting strings may be added to or removed from the system and adaptive power system 200 will self-adjust to the relatively optimal operating voltage.

In various embodiments of the present invention, it may be desirable to have a large distance between the adaptive power system and the load, for example between adaptive power system 200 and load 250 depicted in FIG. 2A. As the distance between the power source and the load increases, there may be an increase in loss of power transferred to the load because of, e.g., losses in the transmission medium between the power source and the load. For example, in a lighting system, the transmission medium may be electrically conductive elements such as wires, and as the wire length increases, for a given wire gauge, the resistive losses in the wire generally increase. As shown in FIG. 18A for an exemplary lighting system having a long distance between the adaptive power system and the load, the resistive loss in the wire will typically result in a lower voltage V2 at the load compared to the voltage output V1 of the power source (here the adaptive power system). As discussed herein, for illumination systems, the adaptive power system measures the current drawn by the LEE load and drives the voltage to the desired operating point based on the I-V signature of the load, which includes the voltage drop in the wires, thereby automatically accounting for the voltage drop in the wire and thereby providing the optimal voltage to the load. In various embodiments, the voltage drop in the wire may also include other parasitic voltage drops in the system, for example in connectors at the adaptive power system and load.

The ability for various embodiments of the present invention to accommodate losses in the transmission medium is not limited to losses in an electrical system. For example, in a system in which a pressure, e.g., a fluid pressure, is supplied to the load, there may be conductance losses in the pressure transfer medium, for example a pipe or tube, and the adaptive system of the present invention may be used to accommodate for the pressure losses and provide the optimal pressure to the load.

In various embodiments of the present invention, it may be desirable to have different groups of light-emitting strings operating at different current levels. In some embodiments, these may be grouped together on one substrate or lightsheet, while in other embodiments these may be on separate substrates or separate lightsheets. In some embodiments, the forward voltage of LEEs 110 varies with current, for example in the case where a LEE 110 includes or consists essentially of a LED, in some embodiments the current is exponentially related to the applied voltage. As the current increases, so does the forward voltage. Thus, for a fixed number of LEEs 110 in a light-emitting string, the string voltage may increase with increased string current. In some embodiments, different substrates or lightsheets may be designed to operate at different current levels, for example to achieve different light output power densities (radiant flux or luminous flux), and there will be a different relatively optimal operating voltage for each type of sheet (current drive level). The ability of the adaptive power system to vary the voltage in response to the current needs, and the fact that the desired value does not need to be programmed into the adaptive power supply, means that one adaptive power supply system may be able to drive, at a relatively optimal voltage level to achieve a high efficiency, a variety of lighting systems or lightsheets that operate at different current levels with no change to the adaptive power supply. In this embodiment, the current is set by current control elements 1010 on the lightsheet and the adaptive power supply provides a variable voltage that is dynamically adjusted to the relatively optimal voltage level of that particular lighting system or lightsheet, based only on the signature of the I-V relationship, without the necessity of knowing the required actual current or voltage values.

Table 3 lists parameters for an exemplary lighting system including or consisting essentially of two different parts using a fixed voltage system. One part is a lightsheet including or consisting of light-emitting strings including or consisting essentially of 20 GaN-based LEDs having a low, nominal and high forward voltage at about 5 mA of about 2.65, 2.75, and 2.85 V respectively. In other words, there is a distribution in the forward voltage value at about 5 mA as a result of manufacturing or operational variations (for example changes in ambient temperature) and the lighting system needs to operate correctly across the entire distribution. This means that it is theoretically possible to have all LEDs in one string have the low value for forward voltage and in another string all the LEDs have the high value. While this scenario may be relatively unlikely, without additional sorting and binning, it is not possible to guarantee that such a situation will not occur, and thus it is included in the design parameters. Similarly, Table 3 shows low, medium, and high forward voltages for the second part, including or consisting essentially of 18 GaN based LEDs having a low, nominal, and high forward voltage at about 15 mA of about 2.85, 2.95, and 3.05 V respectively. Table 3 also shows the minimum voltage required to operate CCE 270, which is about 1.8 V at about 5 mA and about 2.0 V at about 15 mA. The total voltage drop across the LEDs and CCE 270 is the sum of the product of the number of LEDs per string and the forward voltage and the voltage drop across CCE 270. The row labeled "Additional tolerance" is an extra 0.5 V that is added to accommodate any other variations as a result of other manufacturing or operational variation. The "Minimum required voltage" is then the sum of the "Additional tolerance" and the "LEDs+CCE voltage," that is the minimum voltage required to operate the circuit at the design point. As may be seen by observing the minimum required voltage for the different parts with the different distributions, the minimum required voltage varies from about 53.8 V to about 59.3 V. In order to power this lighting system with a fixed voltage system, the fixed voltage value is large enough to power the scenario requiring the highest voltage, which in this case is the high voltage distribution of the 5 mA part. For this example, a fixed applied voltage of 59.5 V is chosen. As discussed herein, the voltage not dropped across the LEDs is dropped across CCE 270, and this value is shown in Table 3 for the different scenarios. As may be seen, the voltage dropped (and dissipated by) CCE 270 ranges from about 2.5 V to about 8.2 V. The power dissipated in CCE 270 may be calculated as the product of the voltage drop across CCE 270 and the current through CCE 270. The efficiency of CCE 270 may also be calculated, for example as the ratio of the voltage drop across the LEDs divided by the fixed applied voltage, and this is shown for each scenario in Table 3. As may be seen, there is a wide range in efficiencies, depending on the part and the LED forward voltage distribution, ranging from about 86.2% to about 95.8%. The efficiency is higher in the scenarios in which the voltage drop across CCE 270 is relatively low.

Now consider a similar lighting system, but operated with an adaptive power supply of the present invention, as shown in Table 4. The same parts and distributions are used as in the example of Table 3; however, in this case the voltage applied to each lightsheet is not fixed, as in the example in relation to Table 3, but adapts to the relatively optimal minimal voltage. In this example the relatively optimal minimal voltage is defined as the sum of 0.5 V, the voltage drop across the LEDs, and the voltage drop required to operate CCE 270 and is shown in Table 4 as the "Adaptive voltage." As may be seen from Table 4, the voltage drop across CCE 270 with an adaptive power supply is uniformly small for all scenarios, resulting in a higher efficiency and a much tighter distribution in efficiency values for the different scenarios. In this example the efficiency ranges from about 95.4% to about 96.1% for adaptive voltages ranging from 53.8 V to 59.3 V. In this example the adaptive voltage supply results in an efficiency greater than about 95% for an adaptive voltage range of about 10% of the desired operating point.

Figure 11:
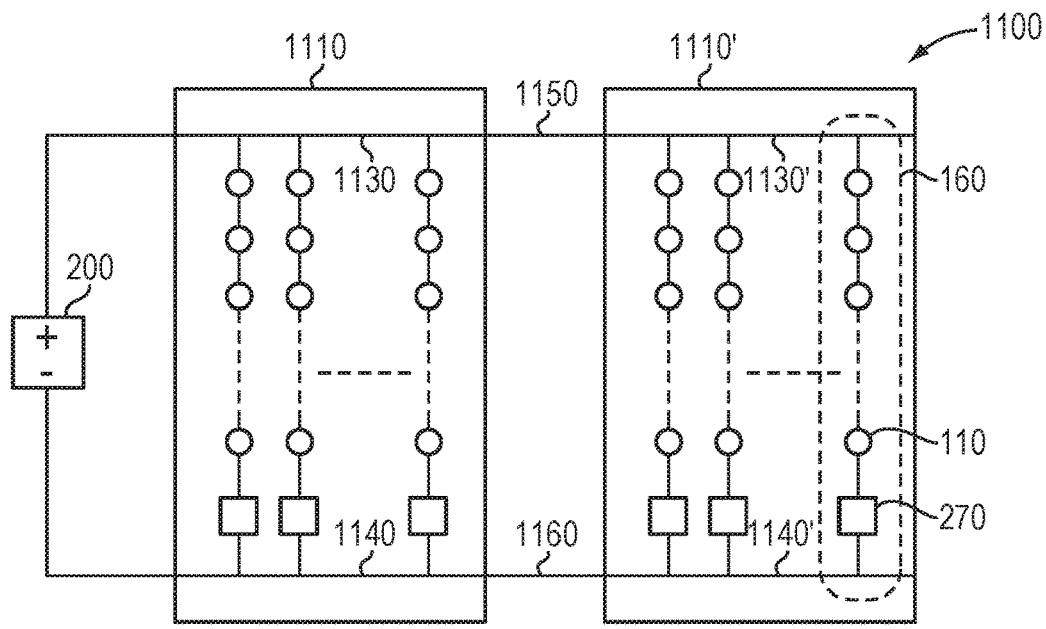
FIG. 11 is a schematic diagram of circuitry of an illumination system in accordance with various embodiments of the invention.

FIG. 11 shows an example of a lighting system 1100 including or consisting essentially of an adaptive power supply 200 and two or more lightsheets 1110 and 1110'. Each lightsheet 1110 and 1110' includes one or more light-emitting strings 160 electrically coupled in parallel, each light-emitting string 160 including or consisting essentially of one or more light-emitting elements 110 electrically coupled in series with at least one CCE 270, as described in the '807 application.

TABLE 3

|  | Unit | Low | Nominal | High | Low | Nominal | High |
| --- | --- | --- | --- | --- | --- | --- | --- |
| Current | mA | 5 | 5 | 5 | 15 | 15 | 15 |
| Forward voltage | V | 2.65 | 2.75 | 2.85 | 2.85 | 2.95 | 3.05 |
| # LEDs per string |  | 20 | 20 | 20 | 18 | 18 | 18 |
| Total LED voltage | V | 53.0 | 55.0 | 57.0 | 51.3 | 53.1 | 54.9 |
| Minimum voltage to operate CCE | V | 1.8 | 1.8 | 1.8 | 2.0 | 2.0 | 2.0 |
| LEDs + CCE voltage | V | 54.8 | 56.8 | 58.8 | 53.3 | 55.1 | 56.9 |
| Additional tolerance | V | 0.5 | 0.5 | 0.5 | 0.5 | 0.5 | 0.5 |
| Minimum required voltage | V | 55.3 | 57.3 | 59.3 | 53.8 | 55.6 | 57.4 |
| Fixed applied voltage | V | 59.5 | 59.5 | 59.5 | 59.5 | 59.5 | 59.5 |
| Voltage across CCE for fixed applied voltage | V | 6.5 | 4.5 | 2.5 | 8.2 | 6.4 | 4.6 |
| CCE efficiency for fixed applied voltage | % | 89.1% | 92.4% | 95.8% | 86.2% | 89.2% | 92.3% |

TABLE 4

|  | Unit | Low | Nominal | High | Low | Nominal | High |
|---|---|---|---|---|---|---|---|
| Current | mA | 5 | 5 | 5 | 15 | 15 | 15 |
| Forward voltage | V | 2.65 | 2.75 | 2.85 | 2.85 | 2.95 | 3.05 |
| # LEDs per string |  | 20 | 20 | 20 | 18 | 18 | 18 |
| Total LED voltage | V | 53.0 | 55.0 | 57.0 | 51.3 | 53.1 | 54.9 |
| Minimum voltage to operate CCE | V | 1.8 | 1.8 | 1.8 | 2.0 | 2.0 | 2.0 |
| LEDs + CCE voltage | V | 54.8 | 56.8 | 58.8 | 53.3 | 55.1 | 56.9 |
| Additional tolerance | V | 0.5 | 0.5 | 0.5 | 0.5 | 0.5 | 0.5 |
| Adaptive voltage | V | 55.3 | 57.3 | 59.3 | 53.8 | 55.6 | 57.4 |
| Voltage across CCE for adaptive voltage | V | 2.3 | 2.3 | 2.3 | 2.5 | 2.5 | 2.5 |
| CCE efficiency for fixed applied voltage | % | 95.8% | 96.0% | 96.1% | 95.4% | 95.5% | 95.6% |

Each lightsheet 1110 includes at least two power conductors 1130, 1140 that distribute power from adaptive power supply 200 to strings 160. At least one lightsheet 1110 is electrically coupled to adaptive power supply 200. In the example shown in FIG. 11, power conductor 1130 is electrically coupled to the positive terminal of adaptive voltage supply 200, while power conductor 1140 is electrically coupled to the negative terminal of adaptive voltage supply 200. However, this is not a limitation of the present invention, and in other embodiments different electrical configurations and different number of power conductors 1130, 1140 on lightsheet 1110 may be utilized. Additional lightsheets, for example lightsheet 1110', may be electrically coupled to the system by electrically coupling like power conductors, for example through connections 1150, 1160, where connection 1150 electrically couples power conductors 1130 and 1130' and connection 1160 electrically couples power conductors 1140 and 1140'. While FIG. 11 shows two lightsheets 1110 and 1110', this is not a limitation of the present invention, and in other embodiments more than two lightsheets may be utilized. Some embodiments of the present invention may include multiple adaptive power supplies 200, each attached to one or more lightsheets 1110.

Figure 12:
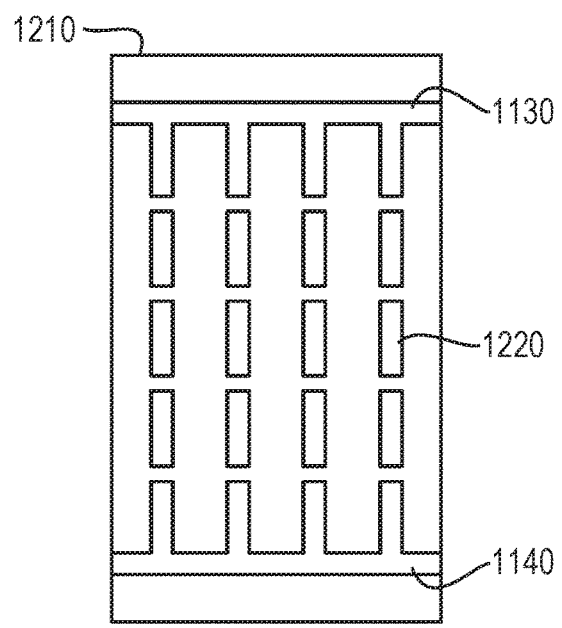
FIG. 12 is a schematic diagram of a portion of an illumination system in accordance with various embodiments of the invention.

In some embodiments, lightsheets 1110 may each include a substrate 1210 over which conductive traces 1220, 1130, 1140 have been formed to provide interconnection between LEEs 110 and CCE 270, as shown in FIG. 12. In some embodiments, substrate 1210 may be flexible, while in other embodiments substrate 1210 may be rigid or substantially rigid. Substrate 1210 may include or consist essentially of a semicrystalline or amorphous material, e.g., polyethylene naphthalate (PEN), polyethylene terephthalate (PET), polycarbonate, polyethersulfone, polyester, polyimide, polyethylene, fiberglass, FR4, metal core printed circuit board, (MCPCB), and/or paper. Substrate 1210 may include multiple layers, e.g., a deformable layer over a rigid layer, for example, a semicrystalline or amorphous material, e.g., PEN, PET, polycarbonate, polyethersulfone, polyester, polyimide, polyethylene, and/or paper formed over a rigid substrate for example comprising, acrylic, aluminum, steel and the like. Depending upon the desired application for which embodiments of the invention are utilized, substrate 1210 may be substantially optically transparent, translucent, or opaque. For example, substrate 1210 may exhibit a transmittance or a reflectivity greater than 70% for optical wavelengths ranging between approximately 400 nm and approximately 700 nm. In some embodiments, substrate 1210 may exhibit a transmittance or a reflectivity of greater than 70% for one or more wavelengths emitted by LEEs 110. Substrate 1210 may also be substantially insulating, and may have an electrical resistivity greater than approximately 100 ohm-cm, greater than approximately $1 \times 10^6$ ohm-cm, or even greater than approximately $1 \times 10^{10}$ ohm-cm. In some embodiments substrate 1210 may have a thickness in the range of about 10 μm to about 200 μm.

Conductive elements, i.e., conductive traces 1220, 1130, 1140, may be formed via conventional deposition, photolithography, and etching processes, plating processes, lamination, lamination and patterning, evaporation sputtering or the like, or they may be formed using a variety of different printing processes. For example, conductive traces 1220, 1130, 1140 may be formed via screen printing, flexographic printing, ink-jet printing, and/or gravure printing. Conductive traces 1220, 1130, 1140 may include or consist essentially of a conductive material (e.g., an ink or a metal, metal film or other conductive materials or the like), which may include one or more elements such as silver, gold, aluminum, chromium, copper, and/or carbon. Conductive traces 1220, 1130, 1140 may have a thickness in the range of about 50 nm to about 1000 μm, or more preferably in the range of about 3 μm to about 50 μm. In some embodiments, the thickness of conductive traces 1220, 1130, 1140 may be determined by the current to be carried thereby. While the thickness of one or more of conductive traces 1220, 1130, 1140 may vary, the thickness is generally substantially uniform along the length of the trace to simplify processing. However, this is not a limitation of the present invention, and in other embodiments the thickness and/or material of conductive traces 1220, 1130, 1140 may vary. In some embodiments, all or portions of conductive traces 1220, 1130, 1140 may be covered or encapsulated. In some embodiments, a layer of material, for example insulating material, may be formed over all or portions of conductive traces 1220, 1130, 1140. Such a material may include, e.g., a sheet of material such as used for substrate 1210, a printed layer, for example using screen, ink jet, stencil or other printing means, a laminated layer, or the like. Such a printed layer may include, for example, an ink, a plastic and oxide, or the like. The covering material and/or the technique by which it is applied is not a limitation of the present invention.

Figure 13:
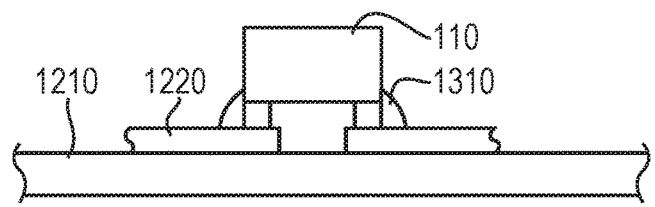
FIG. 13 is a schematic cross-section of a die attached to a substrate in accordance with various embodiments of the invention.

In one embodiment, the conductive traces 1220 are formed with a gap between adjacent conductive traces, and LEEs 110 and CCEs 270 are electrically coupled to conductive traces 1220 using conductive adhesive, e.g., an isotropically conductive adhesive and/or an anisotropic conductive adhesive (ACA). FIG. 13 shows one example of an LEE 110 electrically coupled to conductive traces 1210 using an ACA 1310. ACAs may be utilized with or without stud bumps and embodiments of the present invention are not limited by the particular mode of operation of the ACA. For example, the ACA may be pressure-activated or utilize a magnetic field rather than pressure (e.g., the ZTACH ACA available from SunRay Scientific of Mt. Laurel, N.J., for which a magnetic field is applied during curing in order to align magnetic conductive particles to form electrically conductive "columns" in the desired conduction direction). Furthermore, various embodiments utilize one or more other electrically conductive adhesives, e.g., isotropically conductive adhesives, non-conductive adhesives, in addition to or instead of one or more ACAs. In other embodiments, LEEs 110 and CCEs 270 may be attached to and/or electrically coupled to conductive traces 1220 by other means, for example solder, reflow solder, wave solder, wire bonding, or the like. The technique by which LEEs 110 and CCEs 270 are attached to conductive traces 1220 is not a limitation of the present invention.

In some embodiments, each LEE 110 includes or consists essentially of a bare semiconductor die (e.g., a bare-die LEE is an unpackaged semiconductor die), while in other embodiments LEE 110 includes or consist essentially of a packaged LED. In some embodiments, LEE 110 includes or consists essentially of a packaged surface-mount-device-type LED. In some embodiments, an LEE may include or consist essentially of a LED and a light-conversion material such as a phosphor. In some embodiments, an LEE may include or consist essentially of a LED and a light-conversion material, the combination of which produce substantially white light. In some embodiments, the white light may have a correlated color temperature (CCT) in the range of about 2000 K to about 10,000 K.

In some embodiments, LEE 110 may include or consist essentially of an LED. In some embodiments, LEE 110 may emit electromagnetic radiation within a wavelength regime of interest, for example, infrared, visible, for example blue, red, green, yellow, etc. light or radiation in the UV regime, when activated by passing a current through the device. In some embodiments, LEE 110 may include or consist essentially of a substrate over which the active device layers are formed. The structure and composition of such layers are well known to those skilled in the art. In general, such a layer structure (e.g., for an LED) may include top and bottom cladding layers, one doped n-type and one doped p-type, and one or more active layers (from which most or all of the light is emitted) in between the cladding layers. In some embodiments, the layers collectively may have a thickness in the range of about 0.25 μm to about 10 μm. In some embodiments, the substrate is transparent and all or a portion thereof is left attached to the device layers, while in other embodiments the substrate may be partially or completely removed. In some embodiments LEE 110 may include or consist essentially of a nitride-based semiconductors (for example containing one more of the elements Al, Ga, In, and nitrogen). In some embodiments, LEE 110 may include or consist essentially of a nitride-based semiconductors (for example containing one more of the elements Al, Ga, In, and nitrogen) and may emit light in the wavelength range of about 400 nm to about 500 nm.

In some embodiments, LEE 110 may be at least partially covered by wavelength-conversion material (also referred to herein as a phosphor), PCE, WCE or phosphor element (PE), all of which are utilized synonymously herein unless otherwise indicated. In some embodiments, white light may also be produced by combining the short-wavelength radiant flux (e.g., blue light) emitted by the semiconductor LED with long-wavelength radiant flux (e.g., yellow light) emitted by, for example one or more phosphors within the light-conversion material. The chromaticity (or color), color temperature, and color-rendering index are determined by the relative intensities of the component colors. For example, the light color may be adjusted from "warm white" with a correlated color temperature (CCT) of 2700 Kelvin or lower to "cool white" with a CCT of 10,000 Kelvin or greater by varying the type or amount of phosphor material. White light may also be generated solely or substantially only by the light emitted by the one or more phosphor particles within the light-conversion material. In some embodiments, the structure including or consisting essentially of LEE 110 and a light-conversion material may be referred to as a "white die." In some embodiments, white dies may be formed by forming a light-conversion material over and/or around one or more LEEs 110 and then separating this structure into individual white dies as described in the '864 application. However, this is not a limitation of the present invention, and in other embodiments a light-conversion material may be integrated with an LEE using a variety of different techniques.

While the discussion to this point has been in reference to light-emitting systems, this is not a limitation of the present invention and in other embodiments the adaptive power supply may be utilized with any system including or consisting essentially of an I-V curve having a signature on which a relatively optimal operating point may be identified. For example adaptive power supplies may be used in conjunction with a variety of systems and loads, including but not limited to computers, printers, displays, televisions, audio equipment, scanners, radios, commercial electronics, and the like. While the discussion to this point has been in reference to AC powered systems, for example the power supply topology shown in FIG. 6A, this is not a limitation of the present invention, and in other embodiments the adaptive power supply may be DC powered, for example by a battery or other DC power source. For example adaptive power supplies using DC or battery power may be used in conjunction with a variety of systems and loads, including but not limited to computers, printers, displays, televisions, audio equipment, scanners, radios, mobile phones, laptop computers, tablets, walkie-talkies, flashlights, portable radios, personal music devices, personal video devices, portable commercial and personal electronics, and the like.

Figure 14A:
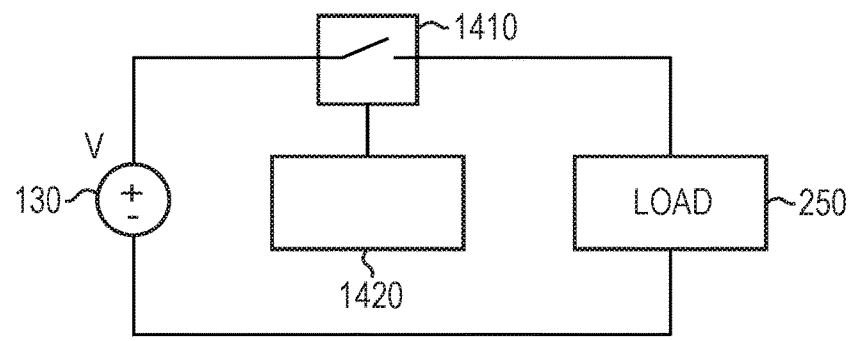
FIG. 14A is a block diagram of a system in accordance with various embodiments of the invention.

In various embodiments of the present invention, it may be desirable to dim or reduce the intensity of light from an illumination system utilizing an adaptive power system. In various embodiments of the present invention, dimming may be accomplished by modulation of the voltage applied to the lighting system, for example modulation of the applied voltage as described in reference to FIGS. 3A and 3B. FIG. 14A shows a schematic of an adaptive power system incorporating a switch 1410 and a switch controller 1420. In some embodiments of the invention, switch 1410 may be configured to interrupt current flow from voltage source 130 to load 250. By varying the amount of time that switch 1410 is open relative to the amount of time that it is closed, the amount of power applied to load 250 (and, in a lighting system, the intensity of light thereby emitted by an LEE load 250) may be varied and controlled. In some embodiments, the control of the switch takes the form of pulse width modulation, in which the duty cycle of a fixed or substantially fixed periodic signal is applied to switch controller 1420, causing switch 1410 to be closed during a portion of the period of the periodic signal and to be open for the remainder of the period of the periodic signal.

Figure 14B:
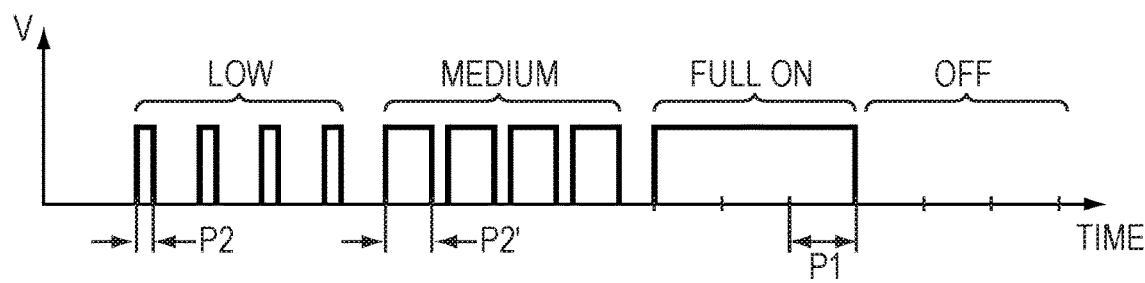
FIGS. 14B, 14C, 14D, 15A, and 15B are timing diagrams in accordance with various embodiments of the invention.

FIG. 14B shows a schematic of one example of pulse width modulation, in which the x-axis represents time and the y-axis represents voltage. The time period P1 is the period of the repeating or modulation signal, with a frequency given by 1/(P1). When the duty cycle of the modulation signal, identified as P2 in FIG. 14B, is less than P1, the power to the load is reduced, and for an illumination system, the light output is relatively reduced. When the duty cycle is relatively longer, for example P2', the output may be at a medium level, and for an illumination system, the light output is relatively increased compared to a duty cycle of P2. When the duty cycle P2 equals or substantially equals the period P1 the system is fully on, and when the duty cycle is zero or substantially zero the system is off, i.e., there is no output (for example, in an illumination system, there is no light emitted by the lighting system).

Figure 14C:
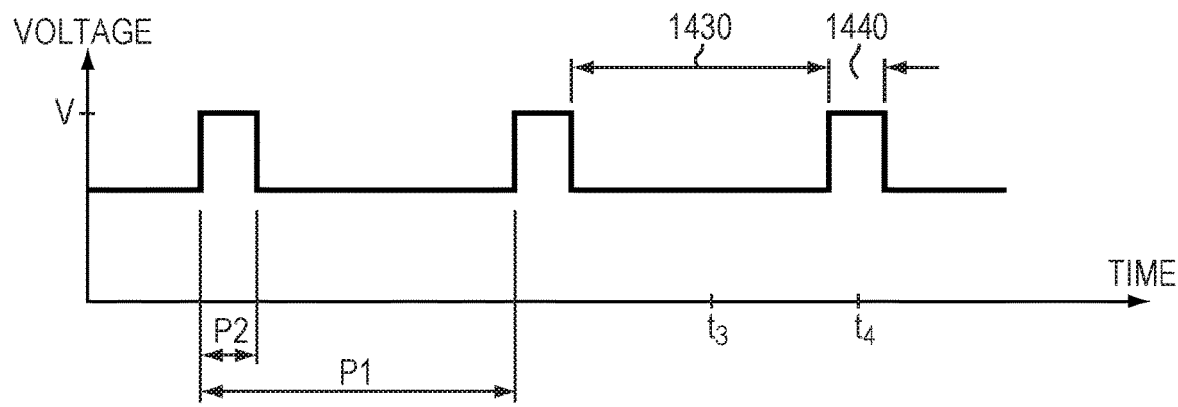

FIG. 14C shows an expanded version of FIG. 14B. As may be seen, the applied voltage V is modulated between essentially zero and the value V. Referring to FIG. 14C, it is clear that if this type of modulation were applied to an adaptive system such as that shown in FIG. 2A, and if the step of measuring the current after a voltage change, for example step 415 or step 425 of process 400 shown in FIG. 4, were performed at time t3, or at any time during time period 1430, the current would not be representative of the actual relationship between the applied voltage and the current and might in fact be zero or substantially zero. On the other hand, if the current were measured at t4, or at any time during time period 1440, the measured current would in general be representative of the actual relationship between the applied voltage and the current.

Figure 14D:
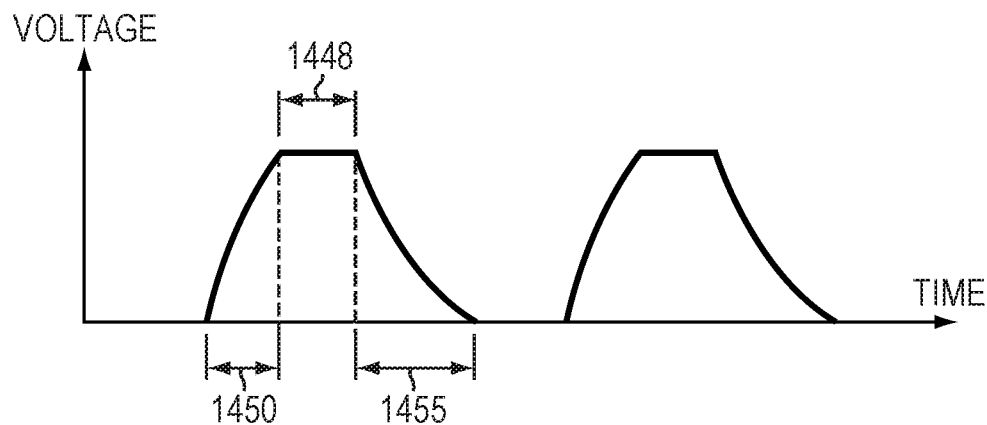

In some embodiments of the present invention, the modulated signal, such as that shown in FIG. 14D, may not be a perfect square wave, but in fact may have a rise time 1450 and a fall time 1455. In such embodiments, the current may be measured during period 1448 to achieve a current value representative of the actual current-voltage relationship of the load.

Figure 15A:
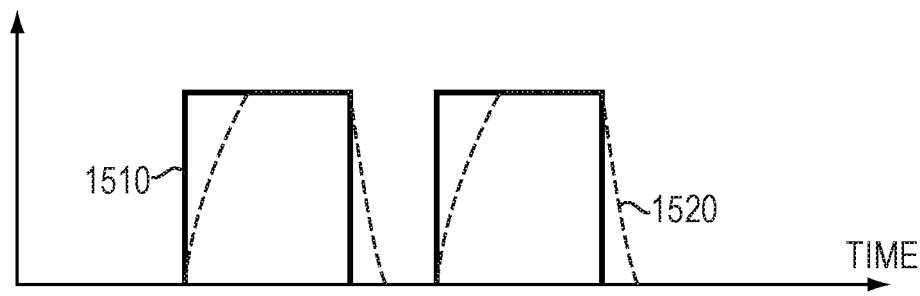
Figure 15B:
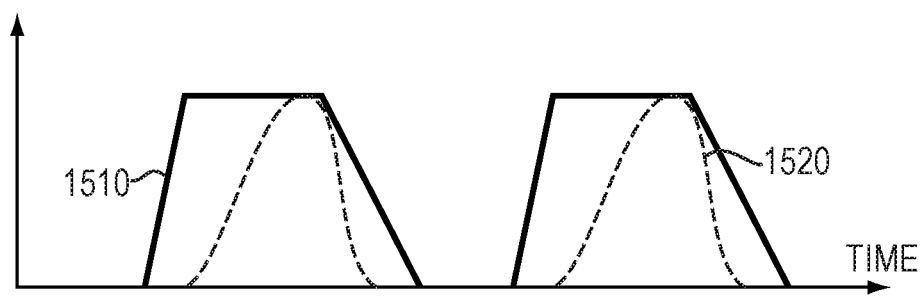

In the examples discussed in reference to FIGS. 14C and 14D, it is assumed that the response to a voltage or input change, for example the current, responds immediately or substantially immediately and has a waveform the same as or substantially the same as the voltage or input signal; however, this is not a limitation of the present invention, and in other embodiments, there may be a time lag between the input change and the output response (e.g., a time lag between the voltage change and the resulting current response), and/or there may be a difference in the shape of the output (e.g., current) waveform and the input (e.g., voltage) waveform. For example, FIG. 15A shows an example in which the output (current) waveform 1520 has a relatively large rise time and fall time compared to input (voltage) waveform 1510. FIG. 15B shows an example in which the output (current) waveform 1520 has a delay and relatively large rise time and turns off earlier than input (voltage) waveform 1510. In such embodiments, additional constraints and/or synchronization may be utilized to ensure that the output (current) is measured at a time that provides a value representative of the actual input-output (e.g., current-voltage) relationship of the load.

While FIG. 14C shows a square wave or a substantially square wave modulation and FIG. 14D shows a square wave with a rise and fall time, these are not limitations of the present invention, and in other embodiments the modulation signal may have other forms, for example a sawtooth waveform, a triangle waveform, a sinusoidal waveform, or the like. The specific shape of the input and/or output (e.g., voltage and/or current) waveform is not a limitation of the present invention.

Figure 16A:
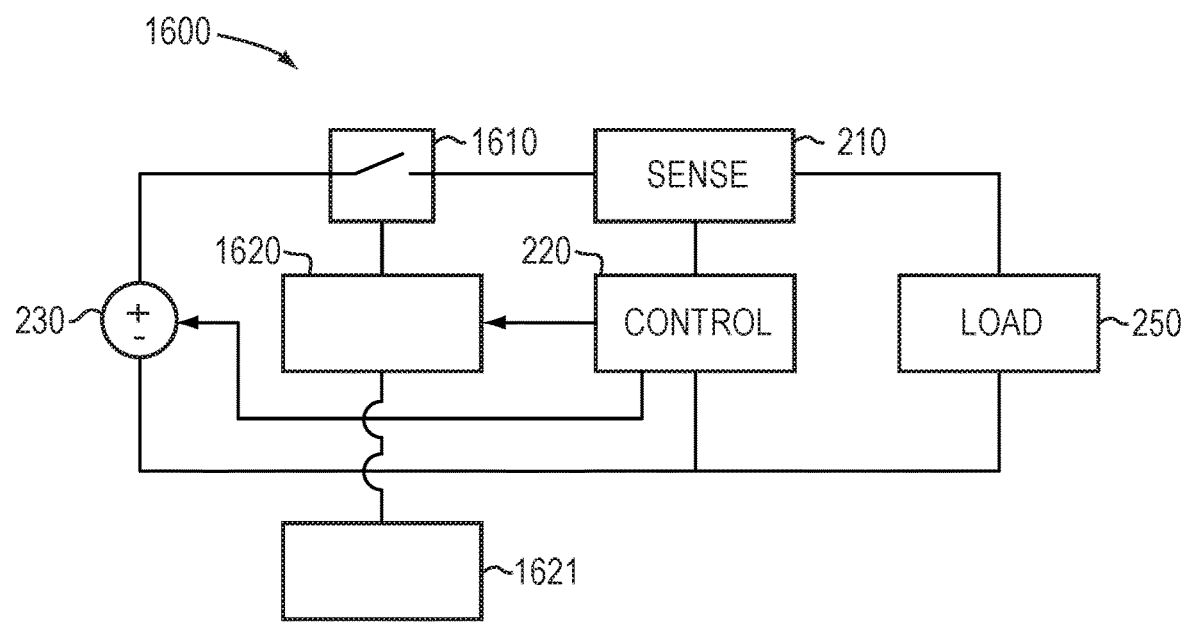
FIG. 16A is a block diagram of a system in accordance with various embodiments of the invention.

FIG. 16A depicts an exemplary adaptive power system 1600 in accordance with embodiments of the present invention, although alternative systems with similar functionality are also within the scope of the invention. As depicted, adaptive power system 1600 includes or consists essentially of variable voltage source 230, sense element 210, controller 220, a modulation controller 1620, and a switch 1610. Adaptive power system 1600 is connected to a load 250 (e.g., one or more LEEs or light-emitting strings). As described herein, controller 220 directs variable voltage source 230 to supply a specific voltage in response to a process embedded within controller 220 and the value of the current sensed by sense element 210. In parallel, modulation controller 1620 directs switch 1610 to open and close in response to a modulation signal 1621. Additionally, controller 220 and modulation controller 1620 communicate together and/or are synchronized such that the current is only sensed by sense element 210 when appropriate (as detailed above).

Figure 16B:
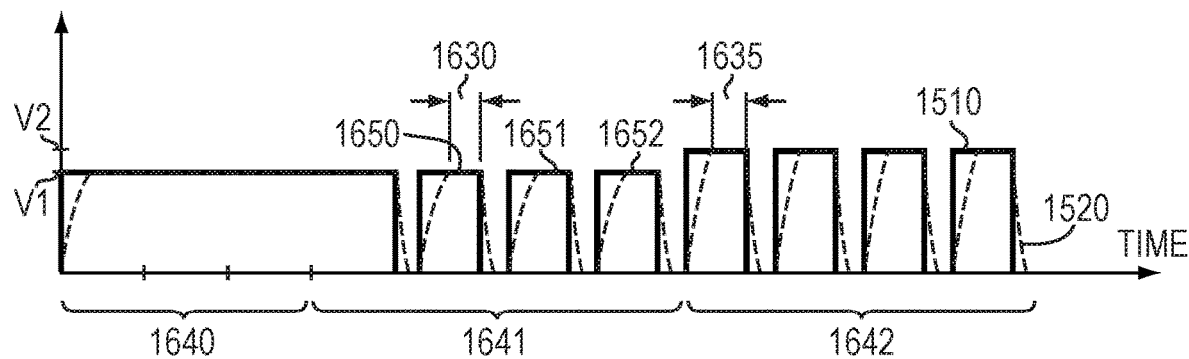
FIGS. 16B and 17 are timing diagrams in accordance with various embodiments of the invention.

FIG. 16B shows an example of a current-voltage relationship of an adaptive power system of the current invention. In time period 1640, no modulation is being applied to the system (i.e., switch 1610 is closed and is not being opened) and the voltage applied to the system, as determined by the adaptive controller, is voltage V1. In time period 1641, modulation controller 1620 is modulating switch 1610, as shown by waveforms 1510 (voltage) and 1520 (current). In time period 1641, the current may be measured during time period 1630. In time period 1642, the adaptive controller has changed the output voltage to voltage V2, and the current may be measured during time period 1635. In some embodiments of the present invention, the rate at which the adaptive controller modifies the voltage from variable voltage source 230 may be less than the rate at which modulation controller 1620 modulates switch 1610, while in other embodiments of the present invention the rate at which the adaptive controller modifies the voltage from variable voltage source 230 may be greater than the rate at which modulation controller 1620 modulates switch 1610.

In various embodiments of the present invention, the time period 1630 (and the time periods associated with currents 1651 and 1652 which are not labelled in FIG. 16B) during which a current measurement may be performed may be optimized for different operational characteristics of the adaptive system. For example, if it is desired for the system to determine the optimal voltage with high accuracy, then a high-resolution current measurement may be performed. In various embodiments, this measurement takes time, and the time may increase with the desired resolution and potentially with the range of currents that may be present. In order to make an accurate measurement, the measurement time is typically less than time period 1650. In various embodiments of the present invention, this constraint may set a minimum dimming level, because the dimming level set by the duty cycle of modulation controller 1620 and the period of the PWM frequency will need to be at least as large as the measurement time. If the PWM period is given by t, and the measurement time is m, then the minimum dimming level is approximately given by m/t. For example for a PWM frequency of about 2 kHz, which corresponds to a period of about 500 μs, and a measurement time of about 50 μs, the minimum dimming level is about 10% (i.e., of the full-scale of illumination levels outputtable by the load). Dimming levels below this minimum dimming (or "threshold") level may cause inaccurate current measurements; thus, in various embodiments of the present invention, the control system may not perform the adaptive functions (for example measure the current or adjust the voltage) and may hold the last voltage setting constant when the dimming level is below the threshold value.

In various embodiments of the present invention, LEEs 110 may include or consist essentially of light-emitting diodes (LEDs). In various embodiments, the forward voltage of the LEDs may shift with LED temperature (for example, the LED junction temperature), and the direction and extent of the shift is dependent on the structure and materials of the LED. Many LEDs exhibit an increase in forward voltage with decreasing LED temperature, and thus at low dimming levels, particularly for extended periods of time, the LED temperature may decrease, resulting in an increase in LED voltage. If the adaptive function is temporarily suspended at low dimming levels, then the load voltage requirement may increase over time at the low dimming level, and this increased requirement may not be supplied by the power supply because the adaptive function is temporarily disabled while the dimming level is below the threshold.

In various embodiments, this effect may be mitigated by the use of an open-loop control system that temporarily replaces the adaptive function when the dimming level is below the threshold value. For example, if the dimming level is below the threshold value and the adaptive functionality is temporarily disabled, the system may increase the output voltage based on the amount of time the dimming level has been below the threshold. For example, the system may start a timer when the dimming level drops below the threshold value and, based on the time elapsed, increase the output voltage, for example based upon an algorithm or a look-up table. The relationship between the dimming level and the junction temperature may be determined experimentally and used to produce the relationship between time and voltage for different dimming levels, e.g., 10%, 5%, and 1%, or other dimming levels in between. Table 5 is an example of a look-up table that may be used for adjusting the output voltage when the dimming level is set below the threshold value for an elapsed time t. As indicated, the voltage adjustment is a relative increase in the output voltage applied to the load regardless of what the absolute voltage level was prior to dimming below the threshold level. In this example, T1<T2<T3<T4 and V1<V2<V3<V4<V5. In various embodiments, this information may be coded or embodied in a look-up table, an equation, an algorithm, or the like. The form of the relationship between t and V may be linear or exponential or may have any form.

TABLE 5

| Elapsed Time | Voltage Increase |
|---|---|
| t < T1 | V1 |
| T1 < t < T2 | V2 |
| T2 < t < T3 | V3 |
| T3 < t < T4 | V4 |
| t > T4 | V5 |

For example, in various embodiments T1 may be in the range of about 2 seconds to about 20 seconds, T2 may be in the range of about 10 seconds to about 40 seconds, T3 may be in the range of about 20 seconds to about 2 minutes, and T4 may be in the range of about 1 minute to about 10 minutes. In an exemplary embodiment, T1 may be about 10 seconds, T2 may be about 30 seconds, T3 may be about 1 minute, and T4 may be about 5 minutes, and V1 may be about zero, V2 may be about 100 mV, V3 may be about 250 mV, V4 may be about 500 mV, and V5 may be about 1V. In other embodiments, the elapsed time thresholds and voltage increase steps may be different, and there may be more or fewer time and voltage steps, as this is not a limitation of the present invention. In various embodiments of the present invention, a temperature sensor attached to the LEE load may be read in order to determine the actual LEE temperature as a function of time, which the system may use to determine a more accurate output voltage adjustment to match the LEE load based on a known relationship of the voltage to LEE junction temperature. This voltage adjustment may again be defined in a look-up table, an equation, an algorithm, or be calculated in real time by the system.

In various embodiments which don't require optimal voltage control for both large and small loads and thus don't need as high an accuracy for current measurement, it may be possible to perform A/D conversions in a shorter time. For example, in various embodiments, relatively lower current measurements may be performed in a time range of about 1 us to about 25 µs. If the PWM frequency is in the range of about 2 kHz (which translates to a period of 500 µs) and the current measurement time is 5 µs, then the minimum dimming duty cycle which may be accommodated and still allow a current measurement to be made accurately is approximately 1%.

In various embodiments which may require optimal voltage control for both large and small loads, as well as accurate current measurement even for low dimming levels, a lower PWM frequency may be used. For example, if the PWM frequency is in the range of 200 Hz (which translates to a period of about 5 ms), and the high accuracy A/D conversion takes, for example, up to 50 us to perform, then the minimum dimming duty cycle which may be accommodated and still allow a current measurement to be made accurately is approximately 1%.

In various embodiments of the present invention, the value of the output (current) may be averaged over more than one modulation cycle, for example to achieve a more representative value of the output (current) or to reduce the noise or variation in the value of the output. For example, the value of currents 1650, 1651, and 1652 may be averaged before being processed by controller 220. In some embodiments, the averaging may be performed in controller 220, while in other embodiments the averaging may take place in a different part or component of the system.

In some embodiments of the present invention, the modulation frequency, for example the frequency at which switch 1610 is modulated, may be in the range of about 100 Hz to about 5000 Hz. In some embodiments, the frequency with which the adaptive power system samples the voltage and measures the current may be less than 100 Hz, for example in the range of about $10^{-6}$ Hz to about 100 Hz. In some embodiments of the present invention, the modulation frequency is in the range of about 500 Hz to about 2000 Hz, and the frequency with which the adaptive power system samples the voltage and measures the current is in the range of about $10^{-4}$ Hz to about 10 Hz. In some embodiments, the output signal may be averaged over 10 modulation periods, over 100 modulation periods, over 1000 modulation periods or over more modulation periods.

In some embodiments of the present invention, modulation controller 1610 and controller 220 may be separate functionally or physically, while in other embodiments modulation controller 1610 and controller 220 may be one unit, physically and/or functionally. In some embodiments of the present invention, switch 1610 may include or consist essentially of a mechanical switch, for example a relay, or may be a semiconductor switch (e.g., one or more transistors) or may be any other type of system; the method of modulating the input signal is not a limitation of the present invention. For example, in some embodiments of the present invention, the output signal may be in the form of a light wave and switch 1610 may be in the form of a mechanical chopper or electro-optic modulation cell.

Modulation signal 1621 may take many forms. In some embodiments, it is an electrical signal and may conform to a number of different communication or signal protocols. For example, modulation signal 1621 may be a 0-10V signal, a 4-20 mA signal, a DALI signal, a DMX signal, or the like. The specific type and configuration of modulation signal 1621 is not a limitation of the present invention. In some embodiments of the present invention, modulation signal 1621 may originate in a manually controlled unit, for example a wall switch or dimming unit, a sensor, for example a daylight or occupancy sensor, a building management system, a portable device like a cellular phone or tablet, or the like. The origin of modulation signal 1621 is not a limitation of the present invention.

Figure 17:
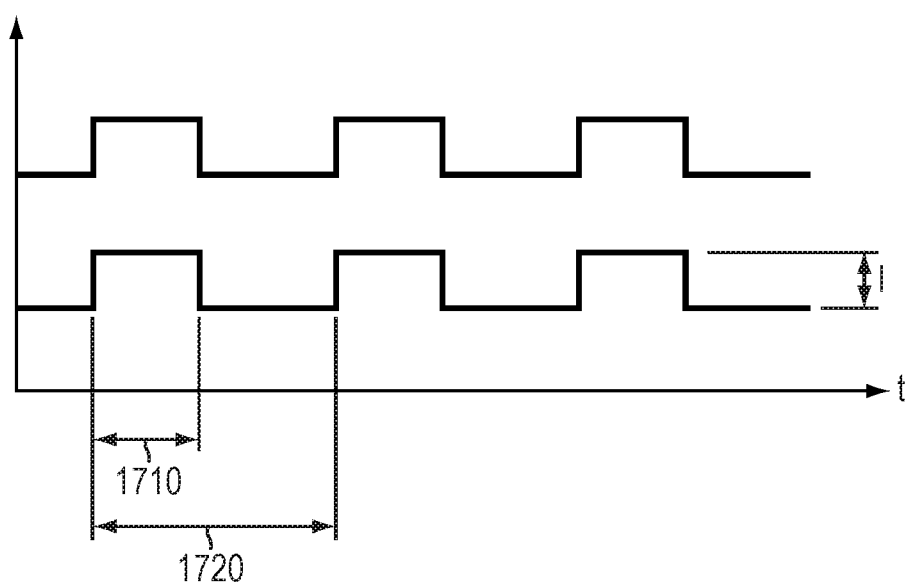

In some embodiments of the present invention, modulation of the input to the system, for example the voltage, may be accommodated by the adaptive power system by integrating the output signal over a period of time and scaling it by the duty cycle of the input signal and the time period. FIG. 17 shows one example of a voltage input and a current output. Let $P_n$=# of periods of modulation over which the integration is occurring;

$T_d$=duty cycle of modulation=period 1710/period 1720;

I=value of current when input voltage is applied to load; and $I_t$=value of current integrated over $P_n$ periods (units of A-sec).

Integrating the current over $P_n$ periods gives a value of $I_t$ A-sec. $I_t = I \times P_n \times T_d$. In this example, I may be determined by dividing $I_t$ by $(P_n \times T_d)$. For example, in one embodiment of the present invention, I is about 1 A, $T_d$ is about 50%, and $P_n$ is 100. The value of $I_t$ is then 50 A-sec. Dividing this by $(P_n \times T_d)$, or 50, then provides the actual value of I. In this embodiment of the present invention, the current has a square waveform or substantially square waveform; however, this is not a limitation of the present invention, and in other embodiments the current and/or voltage (output and/or input) may have other waveform shapes, as described herein.

While FIG. 17 shows $T_d$ as constant or substantially constant over the time period $P_n$, this is not a limitation of the present invention, and in other embodiments $T_d$ may vary within $P_n$, in which case $I_t$ may be determined, for example, as a sum of current elements from each period:

$$It = \sum_{Pn} I \times T_d = \sum (I \times T_{d1} + I + T_{d2} + I \times T_{d3} + \cdots )$$

I may then be calculated from $I_t$ by the equation:

$$I = \frac{I_t}{P_n \times \sum T_d}$$

The equation for calculation of the current value may in some embodiments depend on the specific waveform shape. In some embodiments of the present invention, the waveform shape may be pre-determined and used to formulate an equation to determine the output value to a sufficient level of accuracy. In other embodiments of the present invention, the shape of the current waveform may be determined by the adaptive power system, for example by controller 220, and the determined waveform may be used to formulate an equation to determine the output value to a sufficient level of accuracy. In some embodiments of the present invention, the waveform shape may be determined once or at periodic intervals, while in other embodiments the waveform shape may be determined in real time during each period of modulation.

In various embodiments of the present invention, integration of the current waveform may be accomplished by a digital-to-analog (DAC) conversion process. In various embodiments of the present invention, the DAC process may be performed by a microprocessor or microcontroller or other digital system; however, this is not a limitation of the present invention, and in other embodiments the DAC process may be performed in the analog domain, for example by using a low-pass filter.

Figure 18:
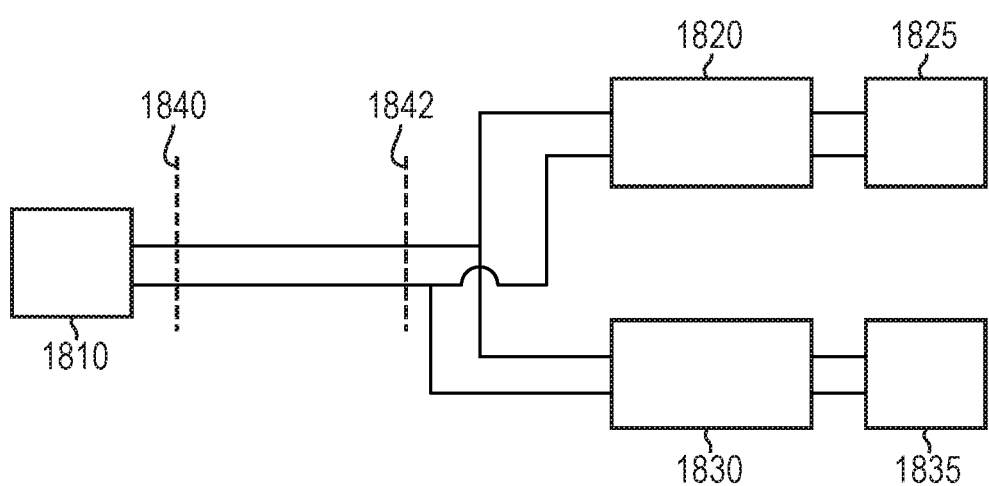
FIG. 18 is a block diagram of a system in accordance with various embodiments of the invention.

In various embodiments of the present invention, it may be desirable to power one or more adaptive systems from one primary power source. For example, FIG. 18 shows a primary power source 1810 providing power to two adaptive systems 1820 and 1830, which are connected to loads 1825 and 1835 respectively; however, this is not a limitation of the present invention, and in other embodiments one or more than two adaptive systems may be utilized and each adaptive system may have more than one load connected thereto. In various embodiments, it may be desirable to have a long distance between primary power source 1810 and adaptive systems 1820 and 1830. As discussed herein, a voltage 1842 at the adaptive systems may be less than a voltage 1840 at the output of the primary power source 1810. In various embodiments, the voltage drop may be too large to be accommodated by the adaptive power systems to provide the desired or optimal voltage to the load. In various embodiments of the present invention, one or more of the adaptive systems may incorporate a boost circuit that is configured to boost the voltage 1842 to a higher desired value. An example of a suitable boost circuit has been described in U.S. patent application Ser. No. 14/664,025, filed on Mar. 20, 2015, the entire disclosure of which is incorporated herein by reference. In various embodiments, the voltage 1842 is lower than required, and it is boosted in adaptive systems 1820 and 1830 to a higher value that is required by loads 1825 and 1835; the system will operate as intended, and the adaptive power system may then set an optimal voltage for loads 1825 and 1835, regardless of the voltage drop between voltages 1840 and 1842. As described with respect to FIG. 18 and herein, various embodiments of the present invention may be configured to accommodate voltage loss along long conductor runs for a variety of system and circuit configurations.

Figure 19A:
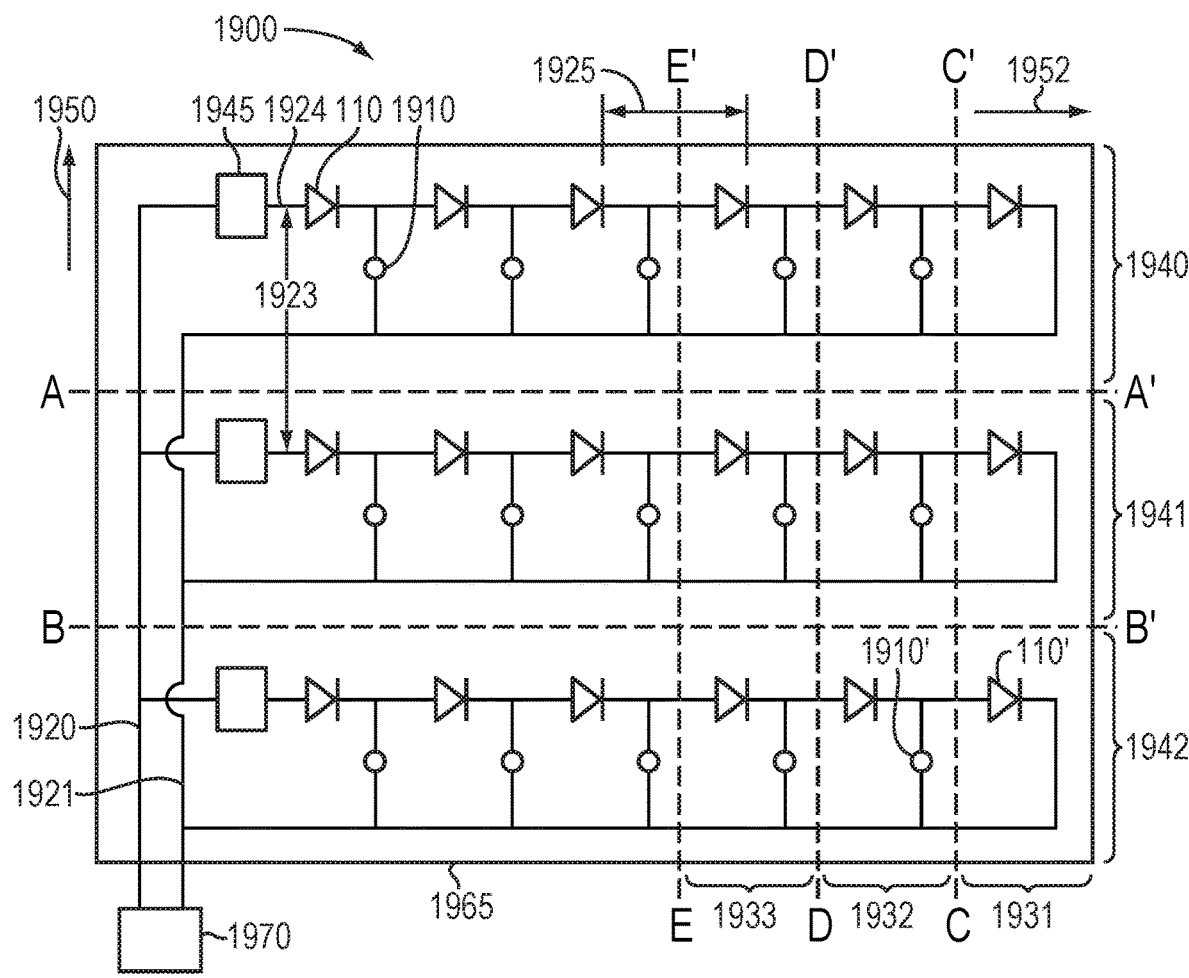
FIG. 19A is a schematic circuit diagram in accordance with various embodiments of the invention.

In various embodiments of the present invention, the adaptive system may be utilized to accommodate a change in the number of LEDs in a system, for example as described in U.S. Provisional Patent Application No. 62/175,725, filed Jun. 15, 2015 (the '725 application), the entire disclosure of which is incorporated by reference herein. For example, consider a system featuring one or more strings of series-connected LEEs as shown in FIG. 19A. FIG. 19A depicts an exemplary lighting apparatus 1900 in accordance with various embodiments of the present invention. Lighting apparatus 1900 includes a substrate 1965 on which are disposed conductive elements 1924, power conductors 1920, 1921, control elements 1945, LEEs 110, and bypass elements 1910. The circuit on substrate 1965 is powered by a power supply 1970. Lighting apparatus 1900 includes three strings 1940, 1941, and 1942 of series-connected LEEs 110; however, this is not a limitation of the present invention, and in other embodiments lighting apparatus 1900 may include fewer or more strings. In FIG. 19A each string includes six LEEs 110; however, this is not a limitation of the present invention, and in other embodiments lighting apparatus 1900 (and/or each string thereof) may include fewer or more LEEs 110. In various embodiments of the present invention, each LEE 110 may represent one LEE or may represent a group of two or more LEEs, as will be discussed herein.

Substrate 1965 may be shortened in the direction 1950 by removing first string 1940 (for example by cutting along cut line A-A') and then string 1941 (for example by cutting along cut line B-B'). In various embodiments of the present invention, the size increment removed when each string removed is equal to or substantially equal to a pitch (or spacing) 1923. In various embodiments, pitch 1923 may be in the range of about 3 mm to about 200 mm. In various embodiments, pitch 1923 may be in the range of about 5 mm to about 50 mm. This structure permits relatively fine control of the size increment when configuring sheet 1965, as described in, for example, the '027 application, the '807 application, and the '725 application.

Reduction of the size of substrate (or "sheet") 1965 in the perpendicular or substantially perpendicular direction 1952 may be accomplished by removing a first LEE group 1931 (for example by cutting along cut line C-C'), then by removing an LEE group 1932 (for example by cutting along cut line D-D'), then removing an LEE group 1933 (for example by cutting along cut line E-E'). When the first LEE group 1931 is removed, it leaves an open circuit that is shunted by one or more of the bypass elements 1910. In various embodiments, bypass element 1910 is or provides an open circuit or a substantially high resistance to current flow when the LEEs of group 1931 are present, and is or provides a short circuit or substantially low resistance to current flow when LEEs of group 1931 are removed.

In various embodiments of the present invention, one or more of the bypass elements 1910 may include or consist essentially of a switch, for example a manually operated switch such as a DIP switch that may, in some embodiments, be mounted on substrate 1965. When a group of LEEs is removed, the associated switch is closed, completing the circuit. For example, if LEE 110' is removed, then switch or bypass element 1910' is closed to complete the circuit.

Figure 19B:
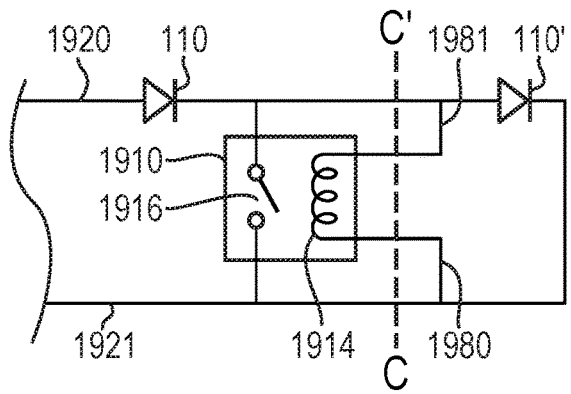
FIGS. 19B and 19C are partial circuit diagrams in accordance with various embodiments of the invention.

In various embodiments of the present invention, bypass element 1910 may be activated by the action of cutting or shortening of the sheet. FIG. 19B shows an example of such an embodiment, in which bypass element 1910 includes or consists essentially of a normally closed relay (only a portion of the circuit is shown for clarity). Relay 1910 includes or consists essentially of a switch 1916 and a coil 1914. Before cutting along cut line C-C' to remove LEE 110', coil 1914 is energized by current flowing from a wire 1981 (herein, references to "wires" are understood to encompass conductive traces or other electrical conductors, and are not limited to discrete wires bonded to different points on a substrate) to the coil and returning to a wire 1980, thus holding switch 1916 open, ensuring normal circuit operation. However, when LEE 110' is removed by cutting along cut line C-C', this also cuts wires 1981, 1980, which de-energizes coil 1914, permitting switch 1916 to close, thus completing the circuit. As will be understood by those skilled in the art, the function performed by relay 1910 may be accomplished by means other than a conventional relay, for example a solid-state relay or other solid-state components acting as a switch or substantially like a switch, for example transistors such as bipolar transistors, field-effect transistors, diodes, or the like.

Figure 19C:
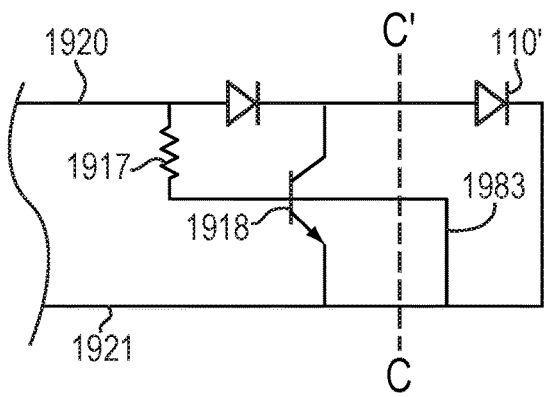

FIG. 19C shows an example of an embodiment of the present invention in which bypass element 1910 includes or consists essentially of a transistor-based circuit. In this example, bypass element 1910 includes a transistor 1918 and a resistor 1917. Before cutting along cut line C-C' to remove LEE 110', the base of transistor 1918 is tied to ground by a wire 1983, the base emitter voltage $V_{BE}$ of transistor 1918 is essentially zero, resulting in no current flow from the collector to the emitter (in essence an open circuit), thus ensuring normal circuit operation. However, when LEE 110' is removed by cutting along cut line C-C', this also cuts wire 1983, which removes the short across the base and emitter of transistor 1918. $V_{BE}$ increases by virtue of current flowing through resistor 1917, turning on transistor 1918, which now acts like a closed switch, completing the circuit.

In various embodiments of this approach, removing one or more LEEs 110 may result in a reduction in the string voltage, i.e., the voltage of the series-connected string of LEEs 110. Referring back to FIG. 2B, FIG. 2B shows a schematic of one string 160 of an exemplary lighting system including current control element 270 and 20 LEEs. The string voltage is given by the sum of the voltage drop across current control element 270 and the voltage drop across the 20 LEEs, for example $V_{CCE} + n \times V_{LEE}$, where $V_{CCE}$ is the voltage drop across current control element 270, n is the number of LEEs in series (in FIG. 2B, n=20), and $V_{LEE}$ is the voltage drop across each LEE. In various embodiments, each LEE may include or consist essentially of a light-emitting diode (LED), and $V_{LEE}$ then represents the forward voltage $V_f$ of the LED at the operating current. For the present discussion it is assumed that each LEE or LED has the same $V_{LEE}$ or $V_f$ respectively; however, in various embodiments $V_{LEE}$ or $V_f$ may have a range of values, for example because of manufacturing variations, component aging, temperature variations across the components, or the like.

When one or more LEEs are removed from the circuit, the string voltage typically decreases. For a constant voltage system, in which, e.g., a constant voltage is supplied by power supply 1970 in FIG. 19A, the string voltage may be required to match or substantially match the voltage supplied by power supply 1970. In various embodiments of the present invention, current control element 1945 may take up or accommodate some voltage difference between the sum of the LEE forward voltages and the power supply voltage. However, in various embodiments, current control element 1945 may not be able to take up or accommodate a relatively larger voltage increment that may be present by removal of one or more LEEs from the string. In various embodiments, power supply 1970 may include or consist essentially of an adaptive power supply that adjusts, i.e., reduces, its output value in response to removal of one or more LEEs from the string. In various embodiments, the shape of the I-V relationship of the string of LEEs is the same or similar, independent of the number of LEEs in the string. For example, consider the I-V curves shown in FIG. 3B, and assume that curve 308 is the "nominal" curve for a system with a fully populated string. When one or more LEEs is removed from the string, for example by cutting along C-C' in FIG. 19A, the I-V curve shifts to the left (to lower voltage), for example to curve 302. On curve 308, the "nominal" operating point is point 370. After removal of one or more LEEs, the operating point shifts approximately to point 340 on curve 302 (the voltage drops, but the current stays substantially the same). At this point, the adaptive process drives the output voltage to the operating point of curve 302, as described herein, resulting in a reduction in the output voltage of the adaptive power supply to match the voltage requirement of the system with fewer LEEs. This process is similar or the same as that described herein, except that in various embodiments the change in voltage required to accommodate removal of one or more LEEs may be larger than the change in voltage required to accommodate voltage changes brought on by component value shift from aging or environmental changes.

Figure 20:
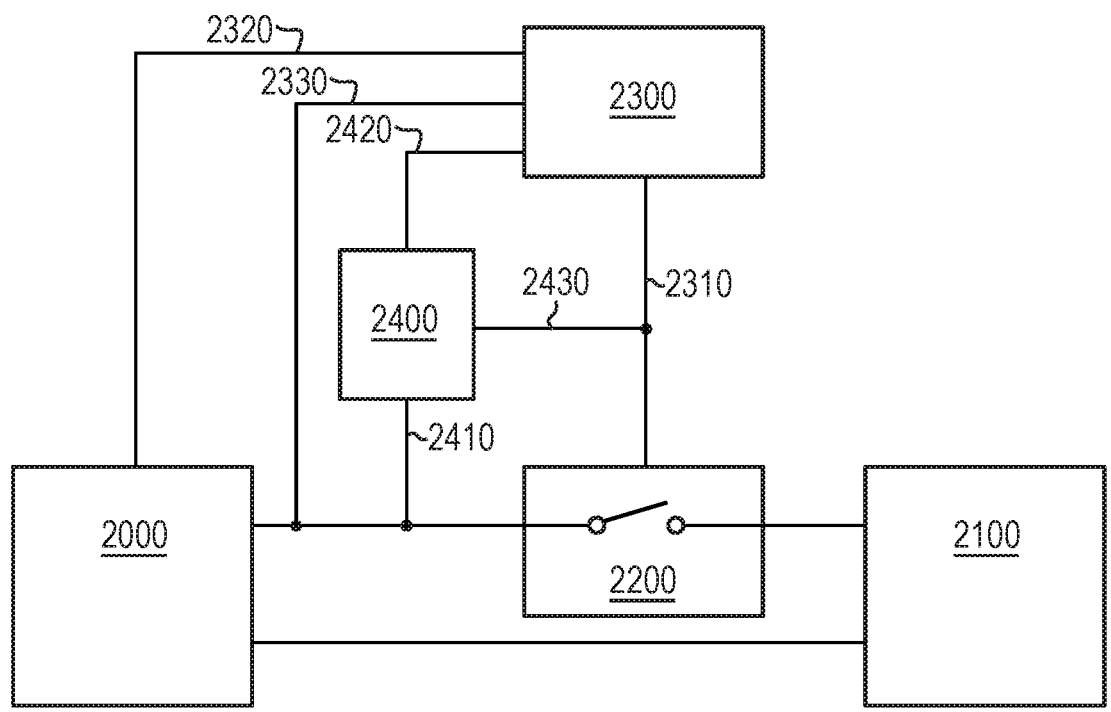
FIG. 20 is a block diagram of a system in accordance with various embodiments of the invention.

In various embodiments of the present invention, an adaptive system may operate to control the voltage applied to the load to achieve an optimal set point to accommodate for the voltage drop anticipated on long cable runs or other components in the system between the power source and the load. FIG. 20 shows an example of one such embodiment. A power source 2000 supplies power to a load 2100 via a switching element 2200. Switching element 2200 may be modulated as discussed herein to provide dimming control for the load via a modulation signal 2310 generated by controller 2300. Controller 2300 may also sense the output voltage of power source 2000 via a sense signal 2330 and feedback a control signal 2320 to regulate the output voltage. A sensing element 2400 may independently monitor the output voltage via a sense signal 2410 and generate an override signal 2430 that may act to disconnect power to the load 2100 by opening switching element 2200. This may be used as a safety measure to ensure that the output voltage of power source 2000 may not exceed a predetermined maximum value Vmax. In various embodiments, sensing element 2400 may be configured with a predetermined trip point Vtrip having a value lower than the value of Vmax, to ensure that Vmax is not exceeded. In various embodiments, Vtrip may be determined as a percentage of Vmax, for example 95% of Vmax or 98% or Vmax, or the difference between Vmax and Vtrip (i.e., Vmax−Vtrip) may be set to a fixed value, e.g., 1 volt or 0.5 volt. The percentage or absolute value difference between Vmax and Vtrip is not a limitation of the present invention. Additionally, in various embodiments, sensing element 2400 may generate an overvoltage trip signal 2420 to alert the controller that the output voltage has exceeded Vmax.

In various embodiments of the present invention, controller 2300 may be configured so it cannot set the output voltage above the Vtrip point, but instead may set it to some optimal voltage based on the V-I characteristic of the load 2100 as discussed herein, in which case under normal operating conditions the output voltage will always remain below Vtrip and sensing element 2400 will never send the override signal 2430. In various other embodiments, controller 2300 may be configured to be able to set the output voltage up to or higher than Vtrip in order to be able to maximize the possible run length for a given system. In this case, one possible control algorithm to find the trip point and set this optimal voltage is:

1. Controller 2300 turns off switching element 2200 and sets output voltage Vout of power source 2000 to Vh, which is the maximum setting available (Vh=Vtrip+/−delta).
2. If overvoltage trip signal is not present, then Vout<Vtrip, then delta is negative so Vout may be applied to the load, or a predetermined lower voltage may be set, for example Vout—0.5V.
3. If overvoltage trip signal is present, then Vout>Vtrip, so reduce Vout by a predetermined step, for example 0.1V.
4. Repeat from Step 2.

In another embodiment, the output voltage is continuously monitored during operation via sense signal 2330. If the measured voltage drifts above the stored set point due to either internal malfunction or external factors such as temperature effects, etc., controller 2300 may step the voltage down further by a predetermined amount, for example 0.1V, to ensure the output voltage does not reach Vtrip, which may undesirably cause the load to shut off unexpectedly.

It is to be understood that the features of the various embodiments described herein are not mutually exclusive and can exist in various combinations and permutations. As used herein, the terms "substantially" and "approximately" mean ±10%, and in some embodiments, ±5%. As used herein, the term "phosphor" refers to any material that shifts the wavelength of light striking it and/or that is luminescent, fluorescent, and/or phosphorescent.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A lighting system powerable by a primary power source, the lighting system comprising:
   a lighting apparatus (i) comprising one or more light-emitting devices, and (ii) having a non-linear current-voltage relationship that comprises a relatively optimal operating point, the relatively optimal operating point comprising a minimum operating voltage resulting in a desired current; and
   a converter for operating the lighting apparatus via application of predetermined first and second different voltages that bound and are different from the relatively optimal operating point, the primary power source supplying power to the converter,
   wherein the converter comprises:
      a variable voltage source;
      a sense element; and
      a controller configured to, during a portion of an operation phase during which the non-linear current-voltage relationship and the relatively optimal operating point do not vary due to temperature variation, repetitively apply the first voltage and then the second voltage to the lighting apparatus.

2. The lighting system of claim 1, wherein the controller is configured to, during the portion of the operation phase, repetitively apply the first and second voltages to the lighting apparatus by:
   (A) applying, via the variable voltage source, the first voltage to the lighting apparatus;
   (B) measuring, via the sense element, a first current resulting from the first voltage applied to the lighting apparatus;
   (C) applying, via the variable voltage source, the second voltage to the lighting apparatus;
   (D) measuring, via the sense element, a second current resulting from the second voltage applied to the lighting apparatus, a current difference between the second current and the first current having a magnitude;
   (E) setting the first current equal to the second current;
   (F) altering the second voltage by a voltage increment based on the magnitude of the current difference; and (G) repeating steps (C) (F) during operation of the lighting apparatus to regulate operation of the lighting apparatus.

3. The lighting system of claim 1, wherein the primary power supplies power to the converter via a second converter, the second converter being configured to (i) receive power supplied by the primary power source and (ii) output to the converter an output voltage different from the first and secon voltages.

4. The lighting system of claim 3, wherein the second converter is seperate from and electrically connectable to the primary power source.

5. The lighting system of claim 2, wherein the controller is configured to alter the second voltage by:
   if the magnitude of the current difference is greater than a pre-determined value, increasing the second voltage by the voltage increment; and
   if the magnitude of the current difference is smaller than the pre-determined value, decreasing the second voltage by the voltage increment.

6. The lighting system of claim 5, wherein the pre-determined value is adjustable.

7. The lighting system of claim 2, wherein the controller is configured to apply, via the controller, a time delay after at least one of the steps (A) (F).

8. The lighting system of claim 2, wherein the controller is configured to limit the maximum voltage applied to the lighting apparatus.

9. The lighting system of claim 2, wherein the magnitude and polarity of the voltage increment are determined from a table of pre-determined rules.

10. The lighting system of claim 2, wherein the first and second voltages are constant over time, within ±10%, in the absence of temporary or permanent variations of the non-linear current-voltage relationship.

11. The lighting system of claim 2, wherein the controller is configured to pause for a pre-determined amount of time between application of the first and second voltages.

12. The lighting system of claim 11, wherein the controller is configured to alter the pre-determined amount of time in the event of a temporary or permanent variation of the non-linear current-voltage relationship.

13. The lighting system of claim 1, wherein the primary power source supplies a constant-voltage output to the converter.

14. The lighting system of claim 1, wherein the primary power source supplies a constant-current output to the converter.

15. The lighting system of claim 1, wherein the lighting apparatus comprises a light-emitting array comprising:
   first and second spaced-apart power conductors; and
   a plurality of light-emitting strings, at least one light-emitting string (i) comprising a plurality of interconnected light-emitting elements spaced along the light-emitting string, (ii) having a first end electrically coupled to the first power conductor, (iii) having a second end electrically coupled to the second power conductor, wherein the power conductors supply power to each of the light-emitting strings.

16. The lighting system of claim 1, wherein an intensity of light emitted by the lighting apparatus is at least partially determined by a current at which the lighting apparatus operates.

17. The lighting system of claim 1, wherein the primary power source supplies power having a voltage or range of voltages unusable by the lighting apparatus, the converter converting the supplied power into a form usable by the lighting apparatus.

18. The lighting system of claim 1, wherein the first and second voltages are constant over time, within ±10%, during the portion of the operation phase.

19. The lighting system of claim 1, wherein the first and second voltages converge towards the relatively optimal operating point over time during the portion of the operation phase.

20. The lighting system of claim 1, wherein the controller is configured to alter the first and second voltages in response to a temporary or permanent variation of the non-linear current-voltage relationship.

21. The lighting system of claim 1, wherein the relatively optimal operating point varies as a function of time.

22. The lighting system of claim 1, wherein the controller is configured to pause for a pre-determined amount of time between application of the first and second voltages.

23. The lighting system of claim 1, wherein the controller is configured to, during a start-up phase preceding the operation phase, apply a series of different voltages to the lighting apparatus that approach, but do not necessarily bound, the relatively optimal operating point.

24. The lighting system of claim 1, wherein (i) the primary power source is configured to output a third voltage, and (ii) the converter comprises a boost circuit for converting output of the primary power source to a voltage larger than the third voltage.

25. The lighting system of claim 24, wherein the converter is separate from and electrically connectable to the primary power source.

26. The lighting system of claim 1, wherein the controller is configured to, during the operation phase, repetitvely apply one the first and second voltages to the lighting apparatus without applying a voltage corresponding to the relatively optimal operating point.

27. The lighting system of claim 1, wherein (i) the first voltage is larger than the relatively optimal operating point, and (ii) the second voltage is less than the relatively optimal operating point.

28. The lighting system of claim 1, wherein the controller is configured to, during the operation phase, repetitively apply only the first and second voltages to the lighting apparatus without applying a voltage between the first and second voltages.

29. The lighting system of claim 1, wherein the pre-determined amount of time increases as a function of time.

* * * * *